US012792498B2

(12) United States Patent
Miriyala et al.

(10) Patent No.: US 12,792,498 B2
(45) Date of Patent: Nov. 10, 2026

(54) DEPLOYMENT CHECKS FOR A CONTAINERIZED SDN ARCHITECTURE SYSTEM

(71) Applicant: Juniper Networks, Inc., Sunnyvale, CA (US)

(72) Inventors: Prasad Miriyala, San Jose, CA (US); Michael Henkel, Saratoga, CA (US); Sridhar Ramachandra Katere, San Jose, CA (US); Pranav Cherukupalli, Milpitas, CA (US); Atul S Moghe, San Jose, CA (US); Ji Hwan Kim, Mountain View, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 350 days.

(21) Appl. No.: 18/468,538

(22) Filed: Sep. 15, 2023

(65) Prior Publication Data

US 2024/0095158 A1 Mar. 21, 2024

Related U.S. Application Data

(60) Provisional application No. 63/376,058, filed on Sep. 16, 2022.

(51) Int. Cl.
*G06F 11/3668* (2025.01)
*G06F 9/455* (2018.01)
(Continued)

(52) U.S. Cl.
CPC ...... *G06F 11/3688* (2013.01); *H04L 41/0866* (2013.01); *H04L 41/0895* (2022.05);
(Continued)

(58) Field of Classification Search
CPC ....... G06F 11/36-3698; G06F 9/45558; G06F 2009/4557; G06F 2009/45575; H04L 43/20; H04L 43/50; H04L 43/55; H04L 41/0866-0869; H04L 41/0895; H04L 41/40
See application file for complete search history.

(56) References Cited

U.S. PATENT DOCUMENTS 9,571,394 B1 2/2017 Sivaramakrishnan et al.
9,590,901 B2 * 3/2017 Tubaltsev ............... H04L 45/74
(Continued)

FOREIGN PATENT DOCUMENTS

WO 2013184846 A1 12/2013

OTHER PUBLICATIONS

Bohlool et al., "Kubernetes Python Client", Github, Oct. 30, 2016, 13 pp., Retrieved from the Internet on Dec. 14, 2023 from URL: https://github.com/kubernetes-client/python.
(Continued)

*Primary Examiner* — Todd Aguilera
(74) *Attorney, Agent, or Firm* — Shumaker & Sieffert P.A.

(57) ABSTRACT

In general, techniques are described for performing pre-deployment checks to ensure that a computing environment is suitably configured for deploying a containerized software-defined networking (SDN) architecture system, and for performing post-deployment checks to determine the operational state of the containerized SDN architecture system after deployment to the computing environment.

20 Claims, 12 Drawing Sheets

(51) Int. Cl.
*H04L 41/0866* (2022.01)
*H04L 41/0895* (2022.01)
*H04L 41/40* (2022.01)
*H04L 43/50* (2022.01)

(52) U.S. Cl.
CPC .......... *H04L 43/50* (2013.01); *G06F 9/45558* (2013.01); *H04L 41/40* (2022.05)

(56) References Cited

U.S. PATENT DOCUMENTS

| | | | | |
|---|---|---|---|---|
| 9,703,660 | B2 * | 7/2017 | Cillis | H04L 43/50 |
| 11,539,612 | B2 * | 12/2022 | Lee | H04L 12/4641 |
| 11,853,197 | B2 * | 12/2023 | Leasck | G06F 11/302 |
| 2014/0130036 | A1 | 5/2014 | Gurikar | |
| 2015/0234725 | A1 * | 8/2015 | Cillis | H04L 43/50 714/33 |
| 2015/0263946 | A1 * | 9/2015 | Tubaltsev | H04L 45/586 370/392 |
| 2020/0344144 | A1 * | 10/2020 | Lee | H04L 12/4641 |
| 2022/0158912 | A1 | 5/2022 | Ikäheimo | |
| 2022/0214949 | A1 | 7/2022 | Holt et al. | |
| 2022/0279420 | A1 | 9/2022 | Akkipeddi et al. | |
| 2022/0398188 | A1 * | 12/2022 | Leasck | G06F 9/451 |
| 2023/0123775 | A1 | 4/2023 | Sivakumar et al. | |
| 2024/0028370 | A1 * | 1/2024 | Lan | G06F 9/5077 |

OTHER PUBLICATIONS

Crickenberger et al., "Kubetest", Github, Aug. 8, 2017, 5 pp., Retrieved from the Internet on Dec. 14, 2023 from URL: https://github.com/kubernetes/test-infra/blob/master/kubetest/README.md.
Crystal, "A Language for Humans and Computers", Oct. 13, 2023, 7 pp., Retrieved from the Internet on Dec. 14, 2023 from URL: https://crystal-lang.org/.
Farcic, "The Implementation Breakthrough—Continuous Deployment, Microservices, and Containters", Packt Publishing, Aug. 31, 2016, 7-23 pp.
Ginkgo, "Ginkgo", Github, 84 pp., Retrieved from the Internet on Dec. 14, 2023 from URL: https://onsi.github.io/ginkgo/.
Go, "Kubernetes", Dec. 13, 2023, 9 pp., URL: https://pkg.go.dev/k8s.io/client-go/kubernetes.
Gomega, "Gomega", Github, 70 pp., Retrieved from the Internet on Dec. 14, 2023 from URL: https://onsi.github.io/gomega/.
Grzondziel et al., "Octopus", Github, Feb. 17, 2019, 2 pp., Retrieved from the Internet on Dec. 14, 2023 from URL: https://github.com/kyma-incubator/octopus.
Hochstein et al., "Principles of Chaos Engineering", Principles of chaos engineering, Mar. 2019, 3 pp., Retrieved from the Internet on Dec. 14, 2023 from URL: https://principlesofchaos.org/.
International Search Report and Written Opinion of International Application No. PCT/US2023/074388 dated Dec. 6, 2023, 15 pp.
Janota et al., "ClusterTestSuite Custom Resource Definition", Github, Mar. 8, 2019, 3 pp., Retrieved from the Internet on Dec. 14, 2023 from URL: https://github.com/kyma-incubator/octopus/blob/master/docs/crd-cluster-test-suite.md.
Juniper Networks, "Cloud Native Contrail Networking: Installation and Life Cycle Management Guide for Upstream Kubernetes", Engineering Simplicity, Jul. 20, 2023, 85 pp.
Kn et al., "Day One: Contrail DPDK vRouter", Engineering Simplicity, Juniper Networks, Jan. 2021, 196 pp.
Kubernetes, "Configure Liveness, Readiness and Startup Probes", Nov. 28, 2023, 12 pp., Retrieved from the Internet on Dec. 14, 2023 from URL: https://kubernetes.io/docs/tasks/configure-pod-container/configure-liveness-readiness-startup-probes/.
Leme et al., "CNCF Cloud Native Definition v1.0", Github, Jul. 17, 2019, 8 pp., Retrieved from the Internet on Dec. 14, 2023 from URL: https://github.com/cncf/toc/blob/main/DEFINITION.md.
Lensmar, "TestKube: A New Approach to Cloud Native Testing", The New Stack, Jan. 12, 2022, 5 pp., Retrieved from the Internet on Dec. 14, 2023 from URL: https://thenewstack.io/testkube-a-new-approach-to-cloud-native-testing/.
Nagele et al., "Chart Testing", Github, Apr. 22, 2018, 7 pp., Retrieved from the Internet on Dec. 14, 2023 from URL: https://github.com/helm/chart-testing.
Ohly, "Kubernetes End-to-end Testing for Everyone", Kubernetes, The Linux Foundation, Mar. 22, 2019, 7 pp., URL: https://kubernetes.io/blog/2019/03/22/kubernetes-end-to-end-testing-for-everyone/.
Ozercan et al., "Gatekeeper", Github, Oct. 21, 2018, 2 pp., Retrieved from the Internet on Dec. 14, 2023 from URL: https://github.com/open-policy-agent/gatekeeper.
Prometheus, "Unit Testing for Rules", 5 pp., Retrieved from the Internet on Dec. 14, 2023 from URL: https://prometheus.io/docs/prometheus/latest/configuration/unit_testing_rules/.
Pytest, "pytest: helps you write better programs", 3 pp., Retrieved from the Internet on Dec. 14, 2023 from URL: https://docs.pytest.org/en/latest/.
Testkube, "Testkube Documentation", Kubeshop, 2 pp., Retrieved from the Internet on Dec. 14, 2023 from URL: https://docs.testkube.io/.
Vapor IO, "kubetest Documentation", Mar. 24, 2021, 77 pp., Retrieved from the Internet on Dec. 14, 2023 from URL: https://kubetest.readthedocs.io/en/latest/.
European Telecommunications Standards Institute, "Network Functions Virtualisation (NFV); Pre-deployment Testing; Report on Validation of NFV Environments and Services", Sep. 1, 2017, 73 pp.
Watve et al., "kubetest2", GitHub, Feb. 17, 2019, 4 pp., Retrieved from the Internet on Dec. 14, 2023 from URL: https://github.com/kubernetes-sigs/kubetest2.
Response to Communication Pursuant to Rules 161(1) and 162 EPC dated Apr. 25, 2025, from counterpart European Application No. 23790173.1, filed Oct. 17, 2025, 31 pp.
Agentpoyo et al., "Testsuite Categories," Jan. 21, 2021, CNF Test Suite, <https://web.archive.org/web/20221113080626/https://github.com/cncf/cnf-testsuite/blob/main/TEST-CATEGORIES.md>.4 pages.

* cited by examiner

DEPLOYMENT CHECKS FOR A CONTAINERIZED SDN ARCHITECTURE SYSTEM

This application claims the benefit of U.S. Provisional Application No. 63/376,058, filed Sep. 16, 2022, which is incorporated by reference herein in its entirety.

TECHNICAL FIELD

The disclosure relates to virtualized computing infrastructure and, more specifically, to deployment of containerized workloads.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such as virtual machines or containers, are deployed and executed on an underlying compute platform of physical computing devices.

Virtualization within a data center or any environment that includes one or more servers can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically-related elements (such groups sometimes referred to as "pods" for some orchestration platforms, e.g., KUBERNETES). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized network architectures.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, techniques are described for performing pre-deployment checks (also referred to as "pre-flight checks" or "pre-flight tests") to ensure that a computing environment is suitably configured for deploying a containerized software-defined networking (SDN) architecture system, and for performing post-deployment checks (also referred to as "post-flight checks" or "post-flight tests") to determine the operational state of the containerized SDN architecture system after deployment to the computing environment. A containerized SDN architecture system (alternatively, "SDN architecture" or "cloud-native SDN architecture") for managing and implementing networking for applications may be deployed to the computing environment. In some examples, the SDN architecture may include data plane elements implemented in compute nodes, and network devices such as routers or switches, and the SDN architecture may also include a containerized network controller for creating and managing virtual networks. In some examples, the SDN architecture configuration and control planes are designed as scale-out cloud-native software with containerized applications. Not all elements of the SDN architecture described herein need be containerized, however.

In some aspects, the pre-deployment and post-deployment checks may be implemented using custom resources of a container orchestration system (also known as a "container orchestrator"). These custom resources may include resources that execute a test suite, and may also include custom resources that execute individual tests of the test suite. The custom resources may be consolidated along with KUBERNETES native/built-in resources.

The techniques described in this disclosure may have one or more technical advantages that realize at least one practical application. For example, the pre-deployment checks and the post-deployment checks can ensure that the computing and network environment can successfully execute workloads that implement the network controller and network data plane and that enable network connectivity among applications (which may themselves be deployed as containerized workloads) deployed to the computing environment. By leveraging the container orchestration framework with custom resources, the techniques may use a common scheme to ensure both the suitability of a computing infrastructure for deploying the network controller and network data plane, as well as the operability of the network controller and network data plane—upon deployment—to configure network connectivity among workloads in the computing infrastructure. The customizable specification and container images used may, in some examples, allow users to execute custom tests "on the fly" without requiring the vendor of the network controller to release new code versions to support the custom tests.

In an example, a system comprises a plurality of servers; and a container orchestrator executing on at least one of the plurality of servers and configured to: create a readiness custom resource in the container orchestrator, the readiness custom resource configured to receive a specification that specifies one or more tests for a software-defined networking (SDN) architecture system, each test of the one or more tests having a corresponding container image configured to implement the test on a server and output a status for the test; create, in the container orchestrator, a readiness test custom resource for each test of the one or more tests; deploy, for each test of the one or more tests, the corresponding container image for the test to execute on at least one server of the plurality of servers; set, based on respective statuses output by the respective container images for the one or more tests, a status for the readiness custom resource; and based on the status for the readiness custom resource indicating success, deploy a workload to at least one of the plurality of servers, wherein the workload implements at least one of: a component of the SDN architecture system, or an application requiring network configuration of the workload by the SDN architecture system.

In an example, a method comprises creating a readiness custom resource in a container orchestrator executing on at least one of a plurality of servers, the readiness custom resource configured to receive a specification that specifies one or more tests for a software-defined networking (SDN) architecture system, each test of the one or more tests having a corresponding container image configured to implement the test on a server and output a status for the test; creating, in the container orchestrator, a readiness test custom resource for each test of the one or more tests; deploying, for each test of the one or more tests, the corresponding container image for the test to execute on at least one server of the plurality of servers; setting, based on respective statuses output by the respective container images for the one or more tests, a status for the readiness custom resource; and based on the status for the readiness custom resource indicating success, deploying a workload to at least one of the plurality of servers, wherein the workload implements at least one of: a component of the SDN architecture system, or an application requiring network configuration of the workload by the SDN architecture system.

In an example, non-transitory computer readable media comprises instructions that, when executed by processing circuitry, cause the processing circuitry to: create a readiness custom resource in a container orchestrator executing on at least one of a plurality of servers, the readiness custom resource configured to receive a specification that specifies one or more tests for a software-defined networking (SDN) architecture system, each test of the one or more tests having a corresponding container image configured to implement the test on a server and output a status for the test; create, in the container orchestrator, a readiness test custom resource for each test of the one or more tests; deploy, for each test of the one or more tests, the corresponding container image for the test to execute on at least one server of the plurality of servers; set, based on respective statuses output by the respective container images for the one or more tests, a status for the readiness custom resource; and based on the status for the readiness custom resource indicating success, deploy a workload to at least one of the plurality of servers, wherein the workload implements at least one of: a component of the SDN architecture system, or an application requiring network configuration of the workload by the SDN architecture system.

The details of one or more examples of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
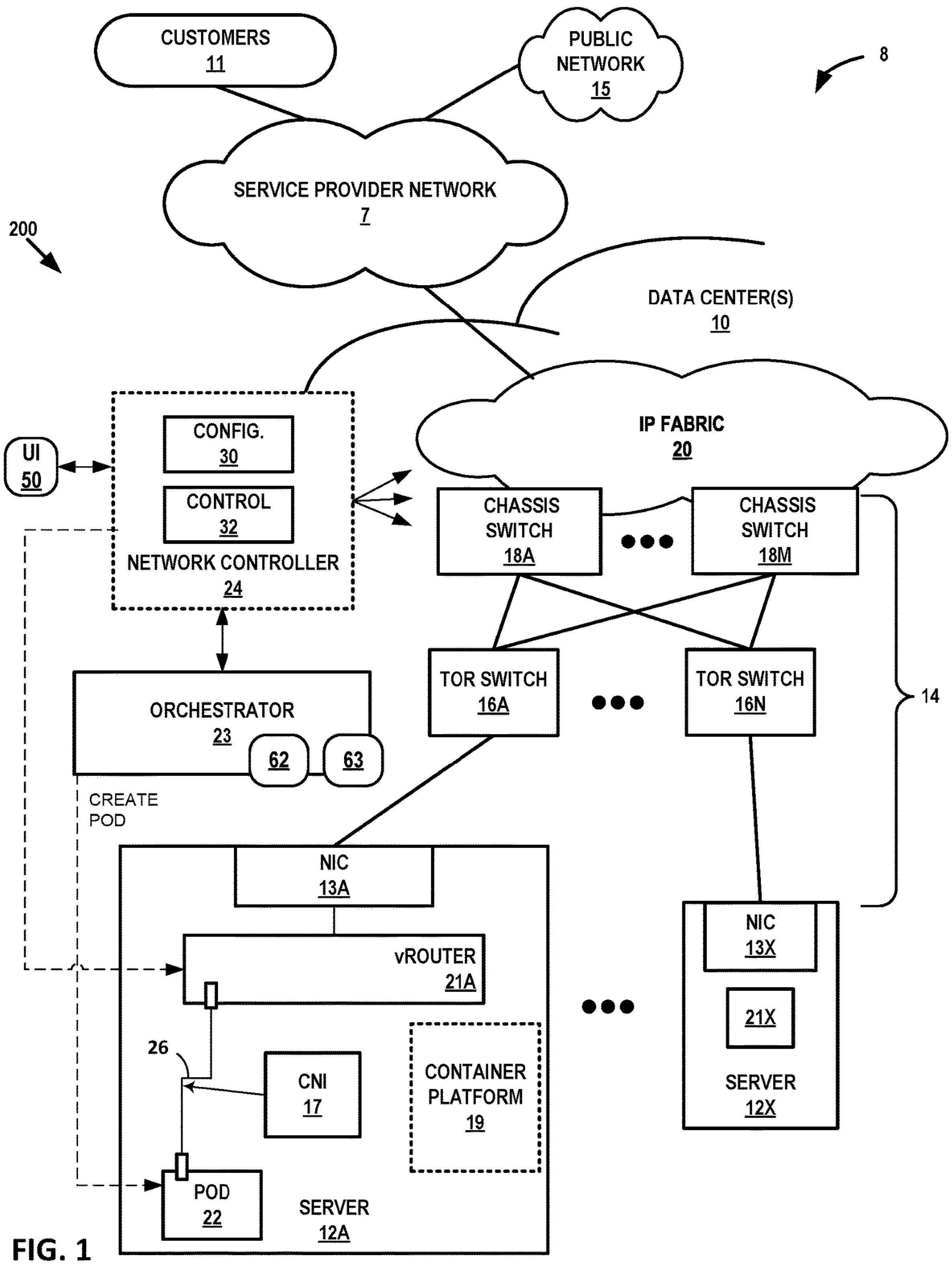
FIG. 1 is a block diagram illustrating an example computing infrastructure in which examples of the techniques described herein may be implemented.

FIG. 1 is a block diagram illustrating an example computing system 8 in which examples of the techniques described herein may be implemented. In the example shown in FIG. 1, the computing system 8 supports software-defined networking (SDN) architectures for virtual and physical networks. However, the techniques described herein may be readily applied to other computing infrastructures and software architectures.

In the example shown in FIG. 1, computing system 8 includes a cloud-native SDN architecture system 200 ("SDN architecture 200"). Example use cases for the cloud-native SDN architecture include 5G mobile networks, cloud and enterprise cloud-native use cases, distributed application deployments, and others. An SDN architecture may include data plane elements implemented in compute nodes (e.g., servers 12) and network devices such as routers or switches, and SDN architecture 200 includes an SDN controller (e.g., network controller 24) for creating and managing virtual networks. The SDN architecture configuration and control planes are designed as scale-out cloud-native software with a container-based microservices architecture. Network controller 24 of the SDN architecture system, as described in detail below, configures the network configuration of workloads deployed to servers 12, including virtual network interfaces, and programs routing information into virtual routers 21 to implement the virtual networks.

As a result, the SDN architecture 200 components may be microservices and, in contrast to existing network controllers, network controller 24 of SDN architecture system 200 assumes a base container orchestration platform (e.g., orchestrator 23) to manage the lifecycle of SDN architecture components. A container orchestration platform is used to bring up SDN architecture 200 components; the SDN architecture uses cloud native monitoring tools that can integrate with customer provided cloud native options; the SDN architecture provides a declarative way of resources using aggregation APIs for SDN architecture objects (i.e., custom resources). The SDN architecture upgrade may follow cloud native patterns, and the SDN architecture may leverage KUBERNETES constructs such as Multus, Authentication & Authorization, Cluster API, KubeFederation, KubeVirt, and Kata containers. The SDN architecture may support data plane development kit (DPDK) pods, and the SDN architecture can extend to support KUBERNETES with virtual network policies and global security policies.

For service providers and enterprises, the SDN architecture automates network resource provisioning and orchestration to dynamically create highly scalable virtual networks and to chain virtualized network functions (VNFs) and physical network functions (PNFs) to form differentiated service chains on demand. The SDN architecture may be integrated with orchestration platforms (e.g., orchestrator 23) such as KUBERNETES ("Kubernetes"), OPENSHIFT ("OpenShift"), MESOS ("Mesos"), OPENSTACK ("OpenStack"), VMWARE ("VMware") vSphere, and with service provider operations support systems/business support systems (OSS/BSS).

In general, one or more data center(s) 10 provide an operating environment for applications and services for customer sites 11 (illustrated as "customers 11") having one or more customer networks coupled to the data center by service provider network 7. Each of data center(s) 10 may, for example, host infrastructure equipment, such as networking and storage systems, redundant power supplies, and environmental controls. Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within any of data center(s) 10. For example, data center(s) 10 may host multiple tenants (customers) each associated with one or more virtual private networks (VPNs), each of which may implement one of customer sites 11.

Service provider network 7 offers packet-based connectivity to attached customer sites 11, data center(s) 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers.

In some examples, each of data center(s) 10 may represent one of many geographically distributed network data centers, which may be connected to one another via service provider network 7, dedicated network links, dark fiber, or other connections. As illustrated in the example of FIG. 1, data center(s) 10 may include facilities that provide network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or super-computing, and so on. Although illustrated as a separate edge network of service provider network 7, elements of data center(s) 10 such as one or more physical network functions (PNFs) or virtualized network functions (VNFs) may be included within the service provider network 7 core.

In this example, data center(s) 10 includes storage and/or compute servers (or "nodes") interconnected via switch fabric 14 provided by one or more tiers of physical network switches and routers, with servers 12A-12X (herein, "servers 12") depicted as coupled to top-of-rack switches 16A-16N. Servers 12 are computing devices and may also be referred to herein as "compute nodes," "hosts," or "host devices." Although only server 12A coupled to TOR switch 16A is shown in detail in FIG. 1, data center 10 may include many additional servers coupled to other TOR switches 16 of the data center 10.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center(s) 10 may also include one or more physical network functions (PNFs) such as physical firewalls, load balancers, routers, route reflectors, broadband network gateways (BNGs), mobile core network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 by service provider network 7. The switching architecture of data center(s) 10 is merely an example. Other switching architectures may have more or fewer switching layers, for instance. IP fabric 20 may include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server or storage server. For example, each of servers 12 may represent a computing device, such as an x86 processor-based server, configured to operate according to techniques described herein. Servers 12 may provide Network Function Virtualization Infrastructure (NFVI) for an NFV architecture.

Any server of servers 12 may be configured with virtual execution elements, such as pods or virtual machines, by virtualizing resources of the server to provide some measure of isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces for communicating on corresponding virtual networks.

Virtual networks are logical constructs implemented on top of the physical networks. Virtual networks may be used to replace VLAN-based isolation and provide multi-tenancy in a virtualized data center, e.g., an of data center(s) 10. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a data center 10 gateway router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A (illustrated as and also referred to herein as "vRouter 21A"), virtual routers 21A-21X (collectively, "virtual routers 21") running in servers 12 are components of the SDN architecture system and used to create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21 of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one virtual execution element present on the server 12.)

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to LINUX ("Linux") Containers (LXC), an operating-system-level virtualization method for running multiple isolated LINUX systems (containers) on a control host using a single LINUX kernel.

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlay the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. Virtual execution elements may represent application workloads. As shown in FIG. 1, server 12A hosts one virtual network endpoint in the form of pod 22 having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 each include at least one network interface card (NIC) 13, which each includes at least one interface to exchange packets with TOR switches 16 over a communication link. For example, server 12A includes NIC 13A. Any of NICs 13 may provide one or more virtual hardware components for virtualized input/output (I/O). A virtual hardware component for I/O maybe a virtualization of the physical NIC (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components. As another example, one or more servers 12 may implement Virtio, a para-virtualization framework available, e.g., for the LINUX Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a LINUX bridge that emulates a hardware bridge and forwards packets among virtual network interfaces of the server or between a virtual network interface of the server and a physical network interface of the server. For DOCKER ("Docker") implementations of containers hosted by a server, a LINUX bridge or other operating system bridge, executing on the server, that switches packets among containers may be referred to as a "DOCKER bridge." The term "virtual router" as used herein may encompass a CONTRAIL ("Contrail") or TUNGSTEN FABRIC ("Tungsten Fabric") virtual router, Open vSwitch (OVS), an OVS bridge, a LINUX bridge, DOCKER bridge, or other device and/or software that is located on a host device and performs switching, bridging, or routing packets among virtual network endpoints of one or more virtual networks, where the virtual network endpoints are hosted by one or more of servers 12.

Any of NICs 13 may include an internal device switch to switch data between virtual hardware components associated with the NIC. For example, for an SR-IOV-capable NIC, the internal device switch may be a Virtual Ethernet Bridge (VEB) to switch between the SR-IOV virtual functions and, correspondingly, between endpoints configured to use the SR-IOV virtual functions, where each endpoint may include a guest operating system. Internal device switches may be alternatively referred to as NIC switches or, for SR-IOV implementations, SR-IOV NIC switches. Virtual hardware components associated with NIC 13A may be associated with a layer 2 destination address, which may be assigned by the NIC 13A or a software process responsible for configuring NIC 13A. The physical hardware component (or "physical function" for SR-IOV implementations) is also associated with a layer 2 destination address.

One or more of servers 12 may each include a virtual router 21 that executes one or more routing instances for corresponding virtual networks within data center 10 to provide virtual network interfaces and route packets among the virtual network endpoints. Each of the routing instances may be associated with a network forwarding table. Each of the routing instances may represent a virtual routing and forwarding instance (VRF) for an Internet Protocol-Virtual Private Network (IP-VPN). Packets received by virtual router 21 of server 12A, for instance, from the underlying physical network fabric of data center 10 (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by virtual router 21. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., pod 22), virtual router 21 attaches a tunnel encapsulation header indicating the virtual network for the packet to generate an encapsulated or "tunnel" packet, and virtual router 21 outputs the encapsulated packet via overlay tunnels for the virtual networks to a physical destination computing device, such as another one of servers 12. As used herein, virtual router 21 may execute the operations of a tunnel endpoint to encapsulate inner packets sourced by virtual network endpoints to generate tunnel packets and decapsulate tunnel packets to obtain inner packets for routing to other virtual network endpoints.

In some examples, virtual router 21 may be a kernel-based and execute as part of the kernel of an operating system of server 12A.

In some examples, virtual router 21 may be a Data Plane Development Kit (DPDK)-enabled virtual router. In such examples, virtual router 21 uses DPDK as a data plane. In this mode, virtual router 21 runs as a user space application that is linked to the DPDK library (not shown). This is a performance version of a virtual router and is commonly used by telecommunications companies, where the VNFs are often DPDK-based applications. The performance of virtual router 21 as a DPDK virtual router can achieve ten times higher throughput than a virtual router operating as a kernel-based virtual router. The physical interface is used by DPDK's poll mode drivers (PMDs) instead of LINUX kernel's interrupt-based drivers.

A user-I/O (UIO) kernel module, such as vfio or uio_pci_generic, may be used to expose a physical network interface's registers into user space so that they are accessible by the DPDK PMD. When NIC 13A is bound to a UIO driver, it is moved from LINUX kernel space to user space and therefore no longer managed nor visible by the LINUX OS. Consequently, it is the DPDK application (i.e., virtual router 21A in this example) that fully manages the NIC 13. This includes packets polling, packets processing, and packets forwarding. User packet processing steps may be performed by the virtual router 21 DPDK data plane with limited or no participation by the kernel (kernel not shown in FIG. 1). The nature of this "polling mode" makes the virtual router 21 DPDK data plane packet processing/forwarding much more efficient as compared to the interrupt mode, particularly when the packet rate is high. There are limited or no interrupts and context switching during packet I/O.

Computing system 8 implements an automation platform for automating deployment, scaling, and operations of virtual execution elements across servers 12 to provide virtualized infrastructure for executing application workloads and services. In some examples, the platform may be a container orchestration system that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include KUBERNETES (a container orchestration system), DOCKER swarm, MESOS/MARATHON, OPENSHIFT, OPENSTACK, VMWARE, and AMAZON ECS.

Elements of the automation platform of computing system 8 include at least servers 12, orchestrator 23, and network controller 24. Containers may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily container hosting devices of a cluster. For example, the KUBERNETES platform uses the terms "cluster master" and "minion nodes," while the DOCKER Swarm platform refers to cluster managers and cluster nodes. The KUBERNETES platform has more recently begun using the terms "control plane nodes" for the virtual or physical machines that host the KUBERNETES control plane, and "worker node" or KUBERNETES node for the virtual or physical machines that hosts containerized workloads in a cluster.

Orchestrator 23 and network controller 24 may execute on separate sets of one or more computing devices or overlapping sets of one or more computing devices. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12 (also referred to as "compute nodes").

In general, network controller 24 controls the network configuration of the data center 10 fabric to, e.g., establish one or more virtual networks for packetized communications among virtual network endpoints. Network controller 24 provides a logically and in some cases physically centralized controller for facilitating operation of one or more virtual networks within data center 10. In some examples, network controller 24 may operate in response to configuration input received from orchestrator 23 and/or an administrator/operator. Additional information regarding example operations of a network controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226,509, filed Mar. 26, 2014, and entitled "Tunneled Packet Aggregation for Virtual Networks," each which is incorporated by reference as if fully set forth herein.

In general, orchestrator 23 controls the deployment, scaling, and operations of containers across clusters of servers 12 and providing computing infrastructure, which may include container-centric computing infrastructure. Orchestrator 23 and, in some cases, network controller 24 may implement respective cluster masters for one or more KUBERNETES clusters. As an example, KUBERNETES is a container management platform that provides portability across public and private clouds, each of which may provide virtualization infrastructure to the container management platform. Example components of a KUBERNETES orchestration system are described below with respect to FIG. 3.

KUBERNETES operates using a variety of KUBERNETES objects—entities which represent a state of a KUBERNETES cluster. KUBERNETES objects may include any combination of names, namespaces, labels, annotations, field selectors, and recommended labels. For example, a KUBERNETES cluster may include one or more "namespace" objects. Each namespace of a KUBERNETES cluster is isolated from other namespaces of the KUBERNETES cluster. Namespace objects may include at least one of organization, security, and performance of a KUBERNETES cluster. As an example, a pod may be associated with a namespace, consequently associating the pod with characteristics (e.g., virtual networks) of the namespace. This feature may enable a plurality of newly-created pods to organize by associating the pods with a common set of characteristics. A namespace can be created according to namespace specification data that defines characteristics of the namespace, including a namespace name. In one example, a namespace might be named "Namespace A" and each newly-created pod may be associated with a set of characteristics denoted by "Namespace A." Additionally, KUBERNETES includes a "default" namespace. If a newly-created pod does not specify a namespace, the newly-created pod may associate with the characteristics of the "default" namespace.

Namespaces may enable one KUBERNETES cluster to be used by multiple users, teams of users, or a single user with multiple applications. Additionally, each user, team of users, or application may be isolated within a namespace from every other user of the cluster. Consequently, each user of a KUBERNETES cluster within a namespace operates as if it were the sole user of the KUBERNETES cluster. Multiple virtual networks may be associated with a single namespace. As such, a pod that belongs to a particular namespace has the ability to access each virtual network of the virtual networks that is associated with the namespace, including other pods that serve as virtual network endpoints of the group of virtual networks.

In one example, pod 22 is a KUBERNETES pod and an example of a virtual network endpoint. A pod is a group of one or more logically-related containers (not shown in FIG. 1), the shared storage for the containers, and options on how to run the containers. Where instantiated for execution, a pod may alternatively be referred to as a "pod replica." Each container of pod 22 is an example of a virtual execution element. Containers of a pod are always co-located on a single server, co-scheduled, and run in a shared context. The shared context of a pod may be a set of LINUX namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19 for running containerized applications, such as those of pod 22. Container platform 19 receives requests from orchestrator 23 to obtain and host, in server 12A, containers. Container platform 19 obtains and executes the containers. In some examples, container platform 19 may be a DOCKER engine, CRI-O, containerd, or MIRANTIS container runtime, for instance.

Container network interface (CNI) 17 configures virtual network interfaces for virtual network endpoints. The orchestrator 23 and container platform 19 use CNI 17 to manage networking for pods, including pod 22. For example, CNI 17 creates virtual network interfaces to connect pods to virtual router 21 and enables containers of such pods to communicate, via the virtual network interfaces, to other virtual network endpoints over the virtual networks. CNI 17 may, for example, insert a virtual network interface for a virtual network into the network namespace for containers in pod 22 and configure (or request to configure) the virtual network interface for the virtual network in virtual router 21 such that virtual router 21 is configured to send packets received from the virtual network via the virtual network interface to containers of pod 22 and to send packets received via the virtual network interface from containers of pod 22 on the virtual network. CNI 17 may assign a network address (e.g., a virtual IP address for the virtual network) and may set up routes for the virtual network interface. In KUBERNETES, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the KUBERNETES cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the KUBERNETES cluster draw network addresses from the new pod virtual network, and corresponding services for such pods draw network addresses from the new service virtual network CNI 17 may represent a library, a plugin, a module, a runtime, or other executable code for server 12A. CNI 17 may conform, at least in part, to the Container Network Interface (CNI) specification or the rkt Networking Proposal. CNI 17 may represent a CONTRAIL, OPENCONTRAIL, MULTUS, CALICO, cRPD, or other CNI. CNI 17 may alternatively be referred to as a network plugin or CNI plugin or CNI instance. Separate CNIs may be invoked by, e.g., a Multus CNI to establish different virtual network interfaces for pod 22.

CNI 17 may be invoked by orchestrator 23. For purposes of the CNI specification, a container can be considered synonymous with a LINUX network namespace. What unit this corresponds to depends on a particular container runtime implementation: for example, in implementations of the application container specification such as rkt, each pod runs in a unique network namespace. In DOCKER, however, network namespaces generally exist for each separate DOCKER container. For purposes of the CNI specification, a network refers to a group of entities that are uniquely addressable and that can communicate amongst each other. This could be either an individual container, a machine/server (real or virtual), or some other network device (e.g. a router). Containers can be conceptually added to or removed from one or more networks. The CNI specification specifies a number of considerations for a conforming plugin ("CNI plugin").

Pod 22 includes one or more containers. In some examples, pod 22 includes a containerized DPDK workload that is designed to use DPDK to accelerate packet processing, e.g., by exchanging data with other components using DPDK libraries. Virtual router 21 may execute as a containerized DPDK workload in some examples.

Pod 22 is configured with virtual network interface 26 for sending and receiving packets with virtual router 21. Virtual network interface 26 may be a default interface for pod 22. Pod 22 may implement virtual network interface 26 as an Ethernet interface (e.g., named "eth0") while virtual router 21 may implement virtual network interface 26 as a tap interface, virtio-user interface, or other type of interface.

Pod 22 and virtual router 21 exchange data packets using virtual network interface 26. Virtual network interface 26 may be a DPDK interface. Pod 22 and virtual router 21 may set up virtual network interface 26 using vhost. Pod 22 may operate according to an aggregation model. Pod 22 may use a virtual device, such as a virtio device with a vhost-user adapter, for user space container inter-process communication for virtual network interface 26.

CNI 17 may configure, for pod 22, in conjunction with one or more other components shown in FIG. 1, virtual network interface 26. Any of the containers of pod 22 may utilize, i.e., share, virtual network interface 26 of pod 22.

Virtual network interface 26 may represent a virtual ethernet ("veth") pair, where each end of the pair is a separate device (e.g., a LINUX/UNIX device), with one end of the pair assigned to pod 22 and one end of the pair assigned to virtual router 21. The veth pair or an end of a veth pair are sometimes referred to as "ports". A virtual network interface may represent a macvlan network with media access control (MAC) addresses assigned to pod 22 and to virtual router 21 for communications between containers of pod 22 and virtual router 21. Virtual network interfaces may alternatively be referred to as virtual machine interfaces (VMIs), pod interfaces, container network interfaces, tap interfaces, veth interfaces, or simply network interfaces (in specific contexts), for instance.

In the example server 12A of FIG. 1, pod 22 is a virtual network endpoint in one or more virtual networks. Orchestrator 23 may store or otherwise manage configuration data for application deployments that specifies a virtual network and specifies that pod 22 (or the one or more containers therein) is a virtual network endpoint of the virtual network. Orchestrator 23 may receive the configuration data from a user, operator/administrator, or other machine system, for instance.

As part of the process of creating pod 22, orchestrator 23 requests that network controller 24 create respective virtual network interfaces for one or more virtual networks (indicated in the configuration data). Pod 22 may have a different virtual network interface for each virtual network to which it belongs. For example, virtual network interface 26 may be a virtual network interface for a particular virtual network. Additional virtual network interfaces (not shown) may be configured for other virtual networks. Network controller 24 processes the request to generate interface configuration data for virtual network interfaces for the pod 22. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JAVASCRIPT ("JavaScript") Object Notation (JSON) format is below.

Network controller 24 sends interface configuration data to server 12A and, more specifically in some cases, to virtual router 21. To configure a virtual network interface for pod 22, orchestrator 23 may invoke CNI 17. CNI 17 obtains the interface configuration data from virtual router 21 and processes it. CNI 17 creates each virtual network interface specified in the interface configuration data. For example, CNI 17 may attach one end of a veth pair implementing management interface 26 to virtual router 21 and may attach the other end of the same veth pair to pod 22, which may implement it using virtio-user.

A conventional CNI plugin is invoked by a container platform/runtime, receives an Add command from the container platform to add a container to a single virtual network, and such a plugin may subsequently be invoked to receive a Del(ete) command from the container/runtime and remove the container from the virtual network. The term "invoke" may refer to the instantiation, as executable code, of a software component or module in memory for execution by processing circuitry.

Network controller 24 is a cloud-native, distributed network controller for software-defined networking (SDN) that is implemented using one or more configuration nodes 30 that implement the network configuration plane and one or more control nodes 32 that implement the network control plane. Each of configuration nodes 30 may itself be implemented using one or more cloud-native, component microservices. Each of control nodes 32 may itself be implemented using one or more cloud-native, component microservices. Each of control nodes 32 and configuration nodes 30 may be executed by control plane nodes of orchestrator 23 and/or by worker nodes. Network controller 24 in this example architecture is conceptual and arises by the operation of control nodes 32 and configuration nodes 30.

The network configuration plane (configuration nodes 30) interacts with control plane components to manage network controller resources. The network configuration plane may manage network controller resources using custom resource definitions (CRDs). The network control plane (control nodes 32) provides the core SDN capability. Control nodes 32 may use BGP to interact with peers, such as other control nodes 32 or other controllers and gateway routers. Control nodes 32 may use XMPP or other protocol to interact with and configure data plane components, such as virtual routers 21, using configure interfaces 256. SDN architecture system 200 supports a centralized network control plane architecture where the routing daemon runs centrally within control nodes 32 and learns and distributes routes from and to the data plane components (vRouters 21) operating on the worker nodes (servers 12). This centralized architecture facilitates virtual network abstraction, orchestration, and automation.

The network data plane resides on all nodes and interacts with containerized workloads to send and receive network traffic. The main component of network data plane is the vRouter, shown as vRouters 21 in respective servers 12 (only vRouter 21A of server 12A is shown for ease of illustration purposes).

In some examples, configuration nodes 30 may be implemented by extending the native orchestration platform to support custom resources for the orchestration platform for software-defined networking and, more specifically, for providing northbound interfaces to orchestration platforms to support intent-driven/declarative creation and managing of virtual networks by, for instance, configuring virtual network interfaces for virtual execution elements, configuring underlay networks connecting servers 12, configuring overlay routing functionality including overlay tunnels for the virtual networks and overlay trees for multicast layer 2 and layer 3.

Network controller 24, as part of the SDN architecture illustrated in FIG. 1, may be multi-tenant aware and support multi-tenancy for orchestration platforms. For example, network controller 24 may support KUBERNETES Role Based Access Control (RBAC) constructs, local identity access management (IAM) and external IAM integrations. Network controller 24 may also support KUBERNETES-defined networking constructs and advanced networking features like virtual networking, BGPaaS, networking policies, service chaining and other telco features. Network controller 24 may support network isolation using virtual network constructs and support layer 3 networking.

To interconnect multiple virtual networks, network controller 24 may use (and configure in the underlay and/or virtual routers—vRouters—21) network policies, referred to as Virtual Network Policy (VNP) and alternatively referred to herein as Virtual Network Router or Virtual Network Topology. The VNP defines connectivity policy between virtual networks. A single network controller 24 may support multiple KUBERNETES clusters, and VNP thus allows connecting multiple virtual networks in a namespace, KUBERNETES cluster and across KUBERNETES clusters. VNP may also extend to support virtual network connectivity across multiple instances of network controller 24.

Network controller 24 may enable multi layers of security using network policies. The KUBERNETES default behavior is for pods to communicate with one another. In order to apply network security policies, the SDN architecture implemented by network controller 24 and virtual router 21 may operate as a CNI for KUBERNETES through CNI 17. For layer 3, isolation occurs at the network level and virtual networks operate at L3. Virtual networks are connected by policy. The KUBERNETES native network policy provides security at layer 4. The SDN architecture may support KUBERNETES network policies. KUBERNETES network policy operates at the KUBERNETES namespace boundary. The SDN architecture may add custom resources for enhanced network policies. The SDN architecture may support application-based security. (These security policies can in some cases be based upon metatags to apply granular security policy in an extensible manner.) For layer 4+, the SDN architecture may in some examples support integration with containerized security devices and/or Istio and may provide encryption support.

Network controller 24, as part of the SDN architecture illustrated in FIG. 1, may support multi-cluster deployments, which is important for telco cloud and high-end enterprise use cases. The SDN architecture may support multiple KUBERNETES clusters, for instance. A Cluster API can be used to support life cycle management of KUBERNETES clusters. KubefedV2 can be used for configuration nodes 32 federation across KUBERNETES clusters. Cluster API and KubefedV2 are optional components for supporting a single instance of a network controller 24 supporting multiple KUBERNETES clusters.

Computing system 8 implements an SDN architecture that is cloud-native and may present various advantages. For example, network controller 24 is a cloud-native, lightweight distributed application with a simplified installation footprint. This also facilitates easier and modular upgrade of the various component microservices for configuration node(s) 30 and control node(s) 32 (as well as any other components of other example of a network controller described in this disclosure). The techniques may further enable optional cloud-native monitoring (telemetry) and user interfaces, a high-performance data plane for containers using a DPDK-based virtual router connecting to DPDK-enabled pods, and cloud-native configuration management that in some cases leverages a configuration framework for existing orchestration platforms, such as KUBERNETES or OPENSTACK. As a cloud-native architecture, network controller 24 is a scalable and elastic architecture to address and support multiple clusters. Network controller 24 in some cases may also support scalability and performance requirements for key performance indicators (KPIs).

The SDN architecture may require sufficient computing resources and a properly configured computing system 8 in order to successfully provide the capabilities, features, and advantages discussed above. However, in view of the variety of features and capabilities that different tenants may require, the SDN architecture may be configured differently for different tenants. It can be difficult to determine whether the resources of computing system 8 that are provided to a tenant can support the requirements of the tenant. Further, it can be difficult to determine if a tenant or service provider has correctly configured the SDN architecture. In existing systems, manual processes may be used to determine if adequate resources exist within computing system 8 and whether the SDN architecture has been configured properly to use those resources. Such manual processes can be time consuming and error prone. As a technical advantage over such systems, the techniques described herein provide for automated checking to determine whether computing system 8 has appropriate and sufficient resources to support an SDN architecture prior to deployment of the SDN architecture (pre-deployment checks), and automated checking that the SDN architecture has been successfully configured and deployed (post-deployment checks).

To that end, and in accordance with techniques of this disclosure, orchestrator 23 is configured with Readiness 62 and Readiness Test 63. Readiness 62 defines custom resources for orchestrator 23 that represent pre-deployment and post-deployment test suites as a whole. Readiness Test 63 defines custom resources for orchestrator 23 that represent individual pre-deployment and post-deployment tests. Custom resources may be KUBERNETES CustomResources created using Custom Resource Definitions (CRDs).

In an example, a new pod (e.g., readiness pod 248 described with respect to FIGS. 2A-2C) will be created on the host network with a custom controller that listens for events relating to any of ApplicationReadiness ("Readiness") 62 and ApplicationReadinessTest ("Readiness Test") 63. User input for Readiness Test 63 may be included in a specification and may specify:

a. A list of tests
 i. If the list is empty, no tests will be executed.
 ii. A user can specify custom tests in this field if any—which may include a reference to a container image that is to run as a test container to perform the custom test. (The customizable specification and container images used may, in some examples, allow users to execute custom tests "on the fly" without requiring the vendor of the network controller to release new code versions to support the custom tests.)
 iii. Each test/container image should conform to a standardized output forward so that the custom controller can parse the output to interpret the status of the test.

iv. A node selector for each entry which selects the node(s) on which to create a job.

b. The name of the configmap (in the default namespace) which contains the installation manifest for SDN architecture 200, such as the network controller 24 nodes and virtual routers 21.

i. This configmap name can be provided to running test pods as a container environment variable.

The custom controller will install custom resources of type ApplicationReadinessTest for each test in the test suite, Readiness Test 63. A job will be started on the selected node(s) for each test, which will run the test container inside of a pod. (The pod may have hostNetwork set to true if the custom controller determines that configuration nodes 30 do not have an API server available—in such cases there is no CNI.) Every custom resource of type Readiness Test 63 may have a comprehensive Status field that will be updated during test execution. The custom controller will compile the final statuses of each test and set the status of the test suite CR, Readiness 62, to a summary of each test. An example customer controller, Readiness controller 249, is described with respect to FIGS. 2A-2C.

Readiness 62 may first be run for pre-deployment to verify that the computing and network environment can successfully execute workloads that implement the network controller. If the summary of Readiness 62 for this first run indicates success, this confirms the environment can support installation of network controller 24 nodes and virtual routers 21. An indication of failure may include suggestions for reconfiguration of one or more components of SDN architecture 200. In some cases, orchestrator 23 may, based on an indication of success, automatically deploy network controller 24 nodes and virtual routers 21. Readiness 62 may then be run for post-deployment with a different specification and different custom resources of type Readiness Test 63 that are suitable to post-deployment checks, to verify that network controller 24 nodes and virtual routers 21 can configure appropriate network connectivity among workloads executing on the worker nodes (servers 12). This may involve validating the operational states of network controller 24 nodes and virtual routers 21, and the readiness of the worker nodes for workloads. If the summary of Readiness 62 for this next run indicates success, SDN architecture 200 is ready to support workload deployments for applications.

In this way, the existing container orchestration framework of orchestrator 23 may be extended with custom resources to use a common scheme to ensure both the suitability of computing system 8 for deploying the network controller 24 and network data plane, as well as the operability of network controller 24 and network data plane—upon deployment—to configure network connectivity among workloads (e.g., pods 22) in computing system 8.

Further details of the above-described SDN architecture may be found in U.S. patent application Ser. No. 17/657,596 entitled "CLOUD NATIVE SOFTWARE-DEFINED NETWORK ARCHITECTURE," filed Mar. 31, 2022, the entire contents of which is incorporated by reference herein.

Figure 2A:
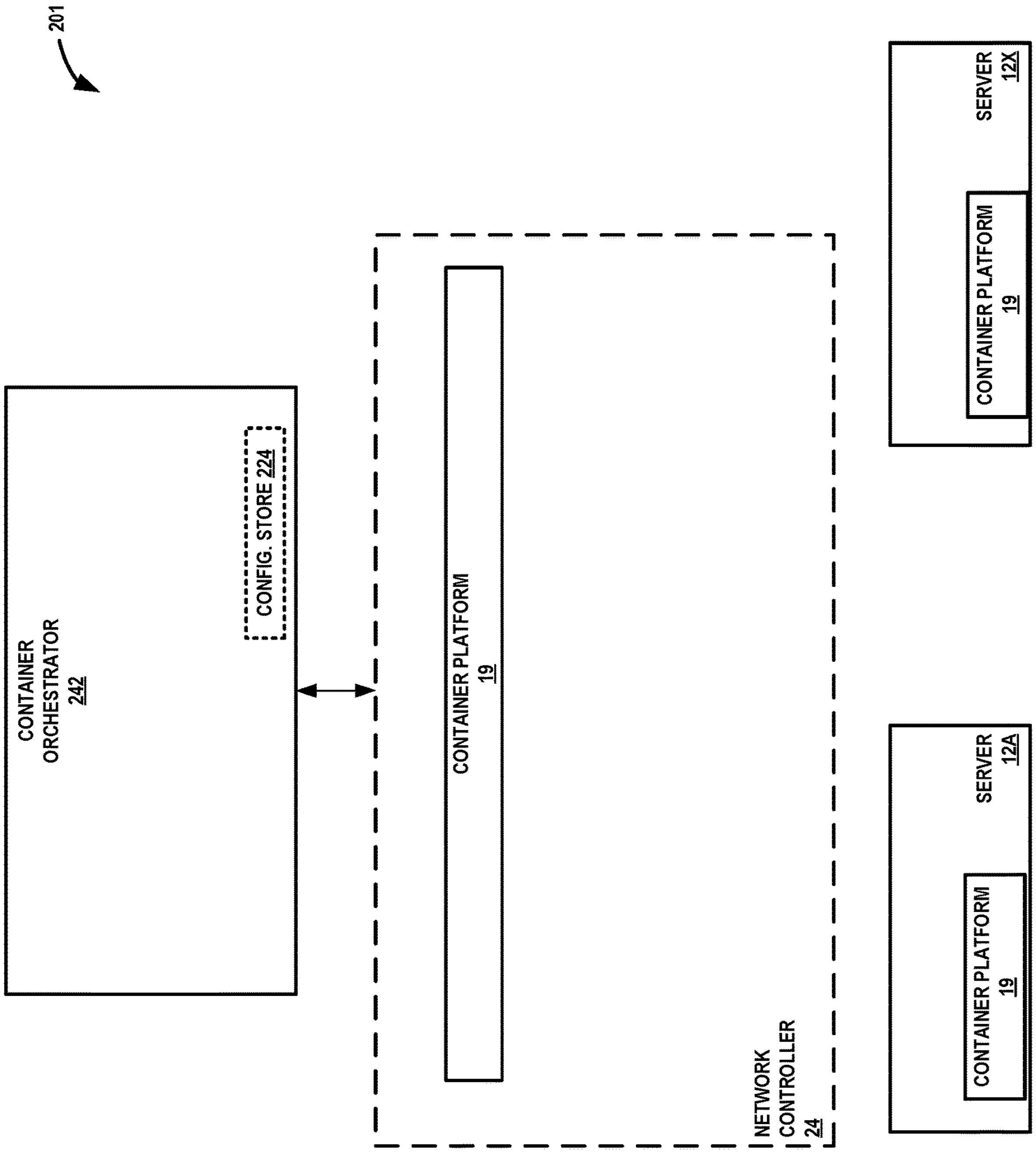
FIGS. 2A-2C are block diagrams illustrating different states of resources of the computing infrastructure prior to, and after, deployment of a containerized SDN architecture system, in accordance with techniques of this disclosure.
Figure 2B:
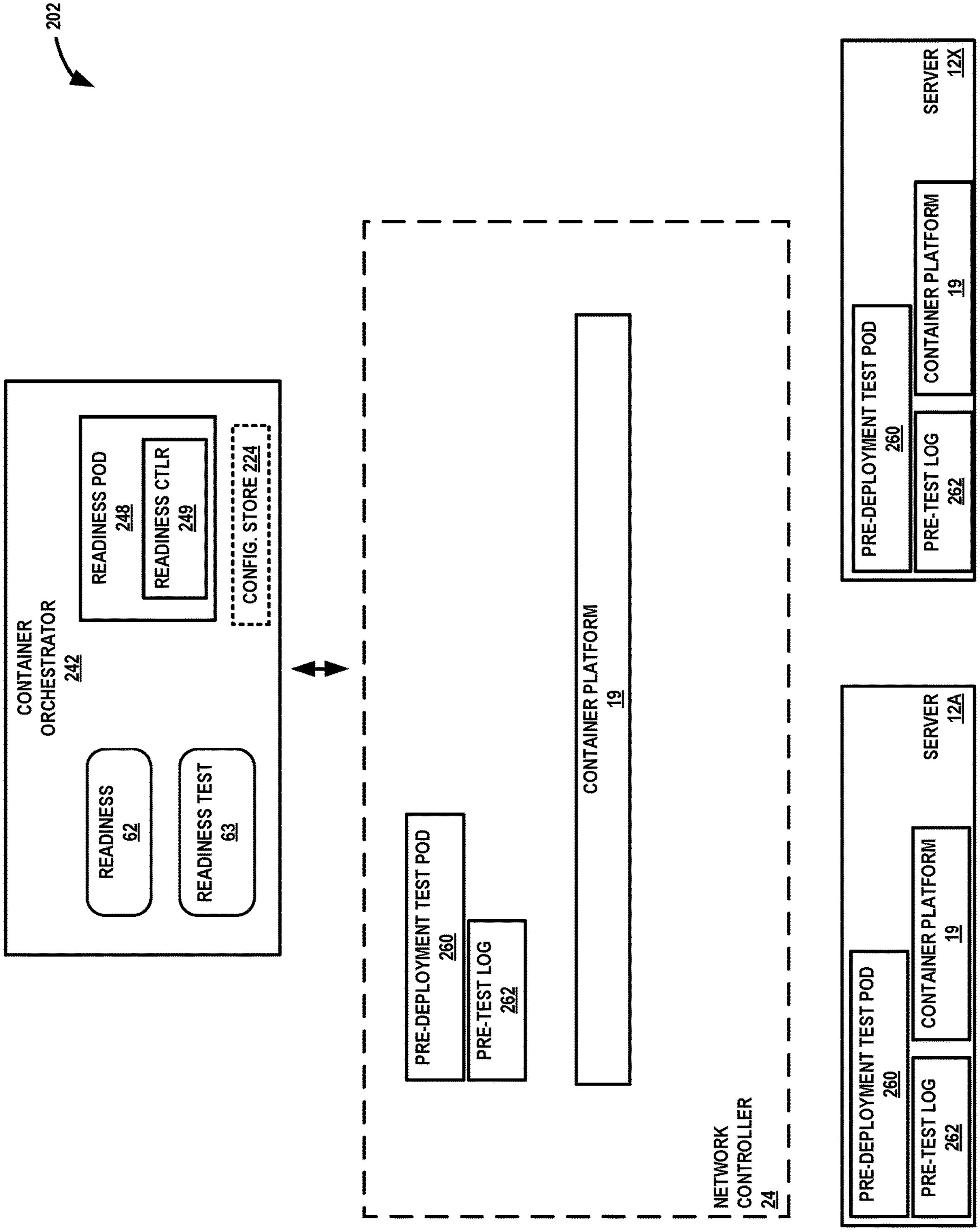
Figure 2C:
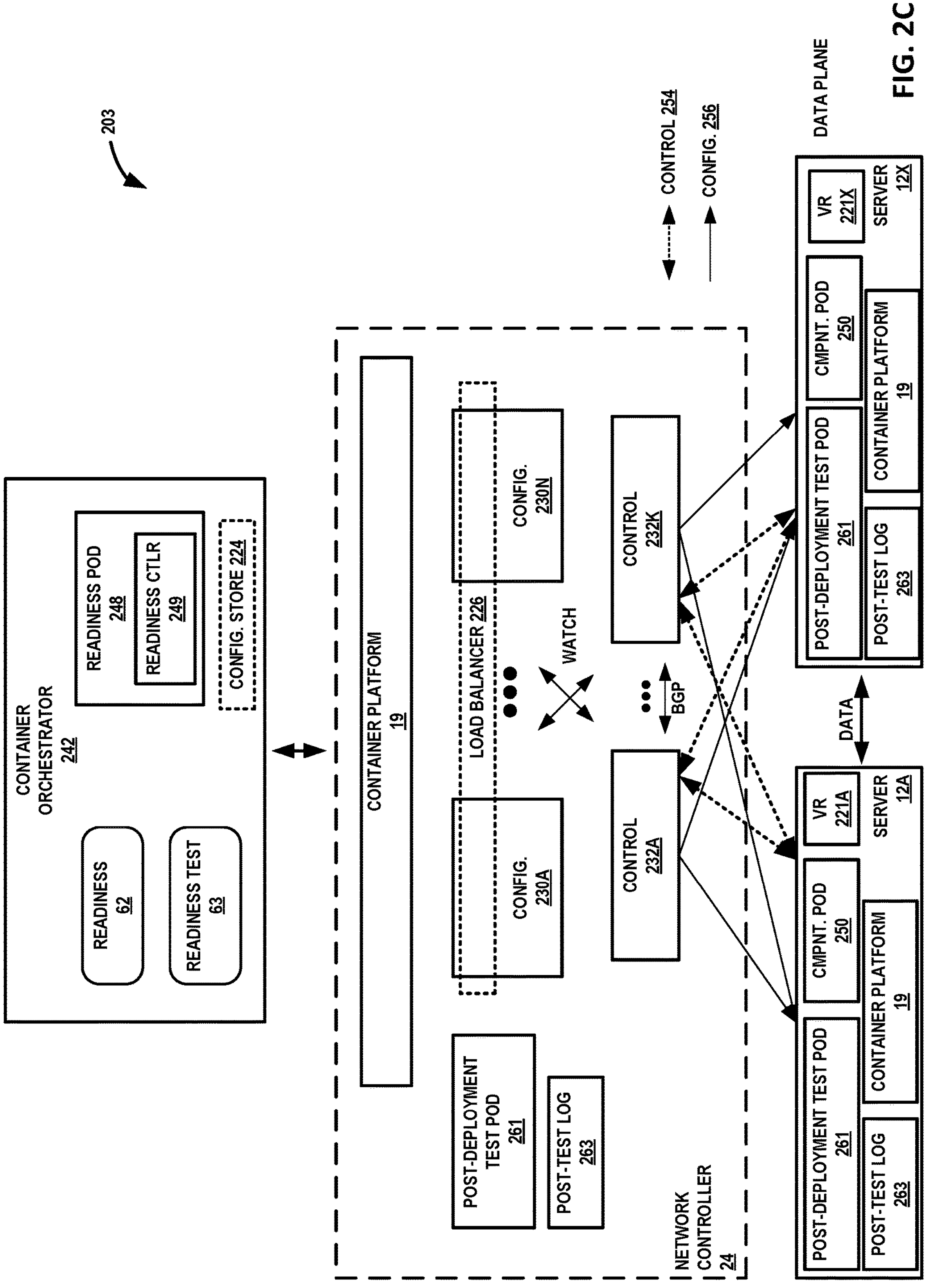

FIGS. 2A-2C are block diagrams illustrating different states of resources of computing system 8 prior to, and after, deployment of a cloud-native SDN architecture. In the examples shown in FIGS. 2A-2C, network controller 24 is shown as being separate from servers 12A-12X (collectively, "servers 12"), for example, by executing on a different server from servers 12. However, network controller 24 can execute on one or more of servers 12 and need not be located on its own server.

FIG. 2A is a block diagram illustrating an initial state 201 of resources of computing system 8, in accordance with techniques of this disclosure. In this initial state, servers 12 may be bare metal servers with minimal software installed on the servers. For example, servers 12 may have an operating system and container platform 19 (or "container runtime") installed. Network controller 24 may be implemented on a server separate from server 12 that may have an operating system and container platform 19 installed.

FIG. 2B is a block diagram illustrating pre-deployment testing state 202 of resources of computing system 8, in accordance with techniques of this disclosure. In the example illustrated in FIG. 2B, pre-deployment checks are performed to validate the current environment and discover incompatibilities that may affect deployment of a containerized network architecture such as an SDN architecture. In some aspects, the pre-deployment tests may be implemented using KUBERNETES custom resources. The definitions of the custom resources may be stored in config store 224. In some aspects, two custom resources definitions (CRDs) are utilized, an "ApplicationReadiness" CRD that defines custom resources (e.g., instances of Readiness 62) that represent pre-deployment and post-deployment test suites as a whole, and an "ApplicationReadinessTest" CRD for that defines custom resources (e.g., instances of Readiness Test 63 that represent individual pre-deployment and post-deployment tests. An example ApplicationReadiness CRD is provided in Appendix A of U.S. Provisional Application No. 63/376,058. An example ApplicationReadinessTest CRD is provided in Appendix B of U.S. Provisional Application No. 63/376,058.

In some aspects, readiness pod 248 may be deployed to a server of computing system 8, for example, one of the server(s) hosting container orchestrator 242. Readiness pod 248 can include readiness controller 249. Readiness controller 249 can be a KUBERNETES custom controller that listens for events related to ApplicationReadiness custom resources. An example definition of readiness controller 249 is provided in Appendix C of U.S. Provisional Application No. 63/376,058.

Readiness controller 249 can receive, as input, an "ApplicationReadinessSpec" that includes information that specifies a list of tests to be performed, a node selector indicating a node or nodes upon which test jobs are to be created, and a ConfigMap name that contains an application installation manifest (e.g., files and other resources to be deployed as part of the application). ConfigMap is an API object used to store data in key-value pairs and can be used to set configuration data separately from application code. Pods can consume ConfigMaps as environment variables, command-line arguments, or as configuration files in a volume. The list of test may comprise indicators of container images that are to be executed to perform the tests. The list of tests can include both pre-defined tests that may be supplied by the application provider and custom tests that have been developed by the tenant or customer. An example ApplicationReadinessSpec is provided in Appendix D of U.S. Provisional Application No. 63/376,058.

In response to receiving an ApplicationReadinessSpec, readiness controller 249 can install custom resources as defined by the ApplicationReadiness CRD. Readiness control 249 can initiate a job (e.g., a workload) on each of the nodes specified by the ApplicationReadinessSpec, e.g., with a node selector. The job can cause tests contained in pre-deployment test pod 260 to be performed on the specified servers 12. A job will be started on the selected node(s) for each test, and the job will run the test container inside of pre-deployment test pod 260. Different pre-deployment tests may be implemented using containers (identified using a reference to a container image as described above with respect to custom tests), which may be deployed using one or more instances of pre-deployment test pod 260. The configmap name can be provided to each pre-deployment test pod 260, for example, as an environment variable. The tests may be Readiness Test 63 custom resources of type ApplicationReadinessTest. The job may be a KUBERNETES job, which creates one or more Pods and will continue to retry execution of the Pods until a specified number of them successfully terminate. As pods successfully complete, the Job tracks the successful completions. When a specified number of successful completions is reached, the task (i.e., Job) is complete. Deleting a Job will clean up the Pods it created. Suspending a Job will delete its active Pods until the Job is resumed again.

An example CRD for a pre-deployment test is provided in Appendix E of U.S. Provisional Application No. 63/376,058. An example CRD for a post-deployment test is provided in Appendix F of U.S. Provisional Application No. 63/376,058.

The container image of each of the tests in pre-deployment test pod 260 can provide output on "standard out" (referred to as "stdout"). In some implementations, output of a test of pre-deployment test pod 260 is in a standardized format, for example, a JSON format.

The pre-deployment test output may include the following key-value fields:

- key: 'timestamp', value: 'string', description of field: RFC3309 formatted timestamp (example: 'timestamp: "2022-03-09T00:20:41Z"').
- key: 'step', value: 'string', description of field: the step of test that has just been executed, formatted in UpperCamelCase.
- key: 'message', value: 'string', description of field: description of what this test step does
- key: 'result', value: 'int', description of field: integer value representing step execution result, 0 for success and any other for failure.
- key: 'failure_reason', value: 'string', description of field: reason for failure if any.

The pre-deployment test output may be directed to pre-test log 262. However, this is optional and readiness controller 249 may listen for events relating to Readiness Test 63 custom resources, such as pre-deployment test output.

An example test output using the above format follows:

Example stdout output of a test

{"timestamp": "2022-03-09T00:20:01Z", "step": "TestStarted", "message": "Test execution started", "result": 0, "failure_reason": " "}

{"timestamp": "2022-03-09T00:20:15Z", "step": "TestResourcesReady", "message": "All test resources are ready", "result": 0, "failure_reason": " "}

{"timestamp": "2022-03-09T00:20:21Z", "step": "TestCompleted", "message": "Test execution completed successfully", "result": 0, "failure_reason": " "}

In some aspects, tests follow a convention that each test includes a "TestStarted" step and a "TestCompleted" step. In some aspects, if there are multiple outputs of a test that include the same step key, only the most recent output of the step key is used. Additionally, each test may have a comprehensive Status field which is updated during test execution.

As tests of pre-deployment test pod 260 are completed, readiness controller 249 obtains the output of the tests (e.g., from pre-test logs 262 or by listening on stdout for all custom resources of type ApplicationReadinessTest) and compiles a final status of each test suite custom resource Readiness 62 into a status for the pre-deployment test suite.

In some aspects, one or more of the following tests may be defined as Readiness Test 63 custom resources and included in pre-deployment test pod 260:

- Resources (CPU/Memory/Disk/Disk speed (fio) etc.) based on the application profile
- inotify watches limit→set warning if low or below double the amount of memory
- Domain Name System (DNS) checks
- Hostname resolution within clusters
- Maximum Transmission Unit (MTU) checks/report
- Network Time Protocol (NTP) checks
- Support for separate management and control/data channels
- Artifactory dependencies, from one version of the application to another (if any)
- Fabric connectivity check
- If there are separate control and data interfaces, ensure nodes can reach each other via those interfaces
- Check gateway configuration
- OS/Kernel versions check, associate with an application release
- DPDK Related checks
  - hugepages
  - Grand Unified Boot loader (GRUB) or other boot loader
- KUBERNETES/Distro versions check
- Known host ports check:
  - Agent (8085) and control introspect ports (8083), xmpp (5269), BGP (179)

In some implementations, components of a network architecture such as an SDN architecture 200 may be deployed over multiple clusters of compute resources in computing system 8. In such implementations, pre-deployment tests/checks may further include:

- Pod and service networks/subnets are unique
- Cluster names are unique
- Connectivity exists between Master and Worker clusters
- Administrative connectivity checks
- Kubeconfigs of distributed clusters are stored in central as a secret, ensure resource in central can be fetched from distributed
- DNS Checks In some aspects, the pre-deployment tests may be performed automatically when a request is received to deploy the components of a network architecture (e.g., an SDN architecture) to computing system 8. In some aspects, the pre-deployment tests may be invoked manually, for example, via a user interface.

FIG. 2C is a block diagram illustrating post-deployment testing state 203 of resources of computing system 8, in accordance with techniques of this disclosure. The discussion of FIG. 2C will be presented using an SDN architecture 200 as an example to be deployed. In this example, network controller 24 of SDN architecture 200 includes configuration nodes 230A-230N ("configuration nodes" or "config nodes" and collectively, "configuration nodes 230") and control nodes 232A-232K (collectively, "control nodes 232"). Configuration nodes 230 and control nodes 232 may represent examples implementations of configuration nodes 30 and control nodes 32 of FIG. 1, respectively. Configuration nodes 230 and control nodes 232, although illustrated as separate from servers 12, may be executed as one or more workloads on servers 12.

Configuration nodes 230 offer northbound, REpresentation State Transfer (REST) interfaces to support intent-driven configuration of SDN architecture 200. Example platforms and applications that may be used to push intents to configuration nodes 230 include virtual machine orchestrator 240 (e.g., OPENSTACK), container orchestrator 242 (e.g., KUBERNETES), user interface 242, or other one or more application(s) 246. In some examples, SDN architecture 200 has KUBERNETES as its base platform.

SDN architecture 200 is divided into a configuration plane, control plane, and data plane, along with an optional telemetry (or analytics) plane. The configuration plane is implemented with horizontally scalable configuration nodes 230, the control plane is implemented with horizontally scalable control nodes 232, and the data plane is implemented with compute nodes.

At a high level, configuration nodes 230 uses configuration store 224 to manage the state of configuration resources of SDN architecture 200. In general, a configuration resource (or more simply "resource") is a named object schema that includes data and/or methods that describe the custom resource, and an application programming interface (API) is defined for creating and manipulating the data through an API server. A kind is the name of an object schema. Configuration resources may include KUBERNETES native resources, such as Pod, Ingress, Configmap, Service, Role, Namespace, Node, Networkpolicy, or LoadBalancer. In accordance with techniques of this disclosure, configuration resources also include custom resources, which are used to extend the KUBERNETES platform by defining an application program interface (API) that may not be available in a default installation of the KUBERNETES platform. In the example of SDN architecture 200, custom resources may describe physical infrastructure, virtual infrastructure, configurations, and/or other resources of SDN architecture 200. As part of the configuration and operation SDN architecture 200, various custom resources may be instantiated. Instantiated resources (whether native or custom) may be referred to as objects or as instances of the resource, which are persistent entities in SDN architecture 200 that represent an intent (desired state) and the status (actual state) of the SDN architecture 200. Configuration nodes 230 provide an aggregated API for performing operations on (i.e., creating, reading, updating, and deleting) configuration resources of SDN architecture 200 in configuration store 224. Load balancer 226 represents one or more load balancer objects that load balance configuration requests among configuration nodes 230. Configuration store 224 may represent one or more etcd databases. Configuration nodes 230 may be implemented using Nginx.

SDN architecture 200 may provide networking for both OPENSTACK and KUBERNETES. OPENSTACK uses a plugin architecture to support networking. With virtual machine orchestrator 240 that is OPENSTACK, the OPENSTACK networking plugin driver converts OPENSTACK configuration objects to SDN architecture 200 configuration objects (resources). Compute nodes run OPENSTACK nova to bring up virtual machines.

With container orchestrator 242 that is KUBERNETES, SDN architecture 200 functions as a KUBERNETES CNI. As noted above, KUBERNETES native resources (pod, services, ingress, external load balancer, etc.) may be supported, and SDN architecture 200 may support custom resources for KUBERNETES for advanced networking and security for SDN architecture 200.

Configuration nodes 230 offer REST watch to control nodes 232 to watch for configuration resource changes, which control nodes 232 effect within the computing infrastructure. Control nodes 232 receive configuration resource data from configuration nodes 230, by watching resources, and build a full configuration graph. A given one of control nodes 232 consumes configuration resource data relevant for the control nodes and distributes required configurations to the compute nodes (servers 12) via control interfaces 254 to the control plane aspect of virtual router 21 (i.e., the virtual router agent—not shown in FIG. 1). Any of compute nodes 232 may receive only a partial graph, as is required for processing. Control interfaces 254 may be XMPP. The number of configuration nodes 230 and control nodes 232 that are deployed may be a function of the number of clusters supported. To support high availability, the configuration plane may include 2N+1 configuration nodes 230 and 2N control nodes 232.

Control nodes 232 distributes routes among the compute nodes. Control node 232 uses internal Border Gateway Protocol (iBGP) to exchange routes among control nodes 232, and control nodes 232 may peer with any external BGP supported gateways or other routers. Control nodes 232 may use a route reflector. Using configuration interfaces 256, control nodes 232 configure virtual routers 21 with routing information for forwarding traffic among workloads using overlay/virtual networks.

Component pods 250 and virtual machines are examples of workloads that may be deployed to the compute nodes by virtual machine orchestrator 240 or container orchestrator 242. Components pods 250 may include elements of SDN architecture 200, and may be interconnected by SDN architecture 200 using one or more virtual networks.

After deployment of SDN architecture 200 (e.g., deployment of component pods 250), readiness controller 249 may execute post-deployment checks specified in the ApplicationReadinessSpec, or in a different specification separate from the pre-deployment specification, to determine if the deployed SDN architecture is ready to process application workloads. As with the pre-deployment Readiness test suite, readiness controller 249 can install custom resources as defined by the ApplicationReadiness CRD. Readiness controller 249 can initiate a job (e.g., a workload) on each of the servers (nodes) specified by the ApplicationReadinessSpec, e.g., with a node selector. The job can cause tests contained in post-deployment test pod 261 to be performed on the specified servers 12. A job will be started on the selected node(s) for each test, and the job will run the test container inside of pre-deployment test pod 260. Different pre-deployment tests may be implemented using containers (identified using a reference to a container image as described above with respect to custom tests), which may be deployed using one or more instances of pre-deployment test pod 260. The configmap name can be provided to each post-deployment test pod 261, for example, as an environment variable. The tests may be Readiness Test 63 custom resources of type ApplicationReadinessTest. The job may be a KUBERNETES job, which creates one or more Pods and will continue to retry execution of the Pods until a specified number of them successfully terminate. As pods successfully complete, the Job tracks the successful completions. When a specified number of successful completions is reached, the task (i.e., Job) is complete. Deleting a Job will clean up the Pods it created. Suspending a Job will delete its active Pods until the Job is resumed again.

The container image of each of the tests in post-deployment test pod 261 can provide output on stdout. In some implementations, output of a test of post-deployment test pod 261 is in a standardized format, for example, a JSON format, and may be similar to those outputs described above with respect to pre-deployment test pods 260. The post-deployment test output may be directed to post-test log(s) 263. However, this is optional and readiness controller 249 may listen for events relating to Readiness Test 63 custom resources, such as post-deployment test output.

In some aspects, post-deployment tests follow a convention that each test includes a "TestStarted" step and a "TestCompleted" step. In some aspects, if there are multiple outputs of a test that include the same step key, only the most recent output of the step key is used. Additionally, each test may have a comprehensive Status field which is updated during test execution.

As tests of post-deployment test pod 261 are completed, readiness controller 249 obtains the output of the tests (e.g., from post-test logs 262 or by listening on stdout for all custom resources of type ApplicationReadinessTest) and compiles a final status of each test suite custom resource Readiness 62 into a status for the post-deployment test suite.

In some aspects, one or more of the following tests may be defined as custom resources and included in a post-deployment test pod 261:

- Application Status (in this example, SDN architecture status)
- Pod to pod communication (same node, across nodes, across KUBERNETES clusters)
- Report Round Trip Time (RTT) and packet loss for ping between pods with both 1 count and n count
- TCP large file (1G) transfer
- UDP large file (1G) transfer
- Report Path MTU and verify it is compatible with its interface
- Test query to API server (configuration or operational status)
- Report TCP segment size
- Re-run multi-cluster preflight tests for multi-cluster flavors
- Report all SDN architecture resources not in success state In some aspects, the post-deployment tests may be performed automatically after components of a network architecture is deployed (e.g., an SDN architecture) to computing system 8. In some aspects, the post-deployment tests may be invoked manually, for example, via user interface 50.

Figure 3:
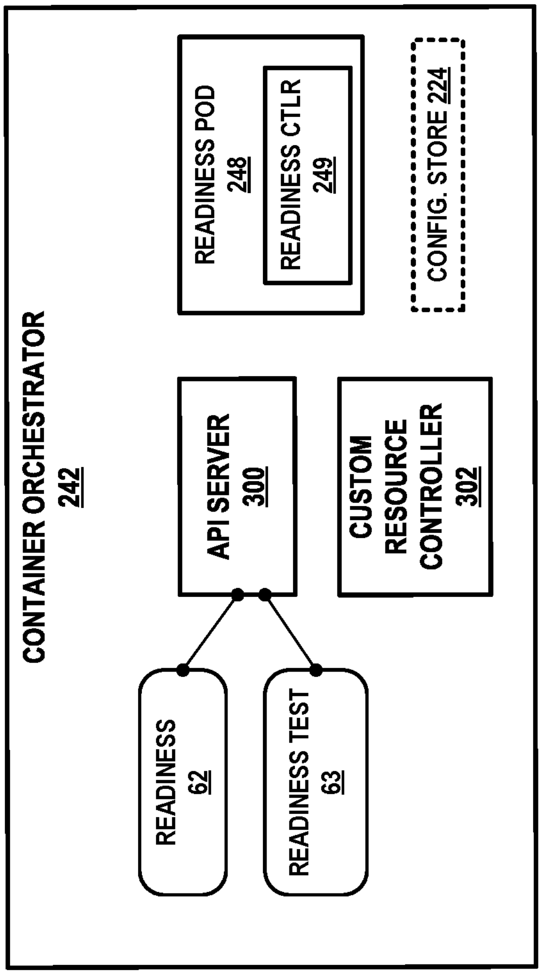
FIG. 3 is a block diagram illustrating another view of components of a container orchestrator and in further detail, in accordance with techniques of this disclosure.

FIG. 3 is a block diagram illustrating another view of components of a container orchestrator and in further detail, in accordance with techniques of this disclosure. Custom resources are extensions of the KUBERNETES API. A resource is an endpoint in the KUBERNETES API that stores a collection of API objects of a certain kind; for example, the built-in "pods" resource contains a collection of Pod objects. A custom resource is an extension of the KUBERNETES API that is not necessarily available in a default KUBERNETES installation. The custom resource represents a customization of a particular KUBERNETES installation. Custom resources can appear and disappear in a running cluster through dynamic registration, and cluster admins can update custom resources independently of the cluster itself. Once a custom resource is installed, users can create and access its objects using kubectl, just as they do for built-in resources like Pods.

In the example shown in FIG. 3, container orchestrator 242 includes readiness pod 248, API server 300, custom resource controller 302, configuration store 224, readiness pod 248 containing readiness controller 249, and container platform 19. API server 300 may be a KUBERNETES API server. Custom resources associated with pre-deployment and post-deployment testing are described above.

Figure 6:
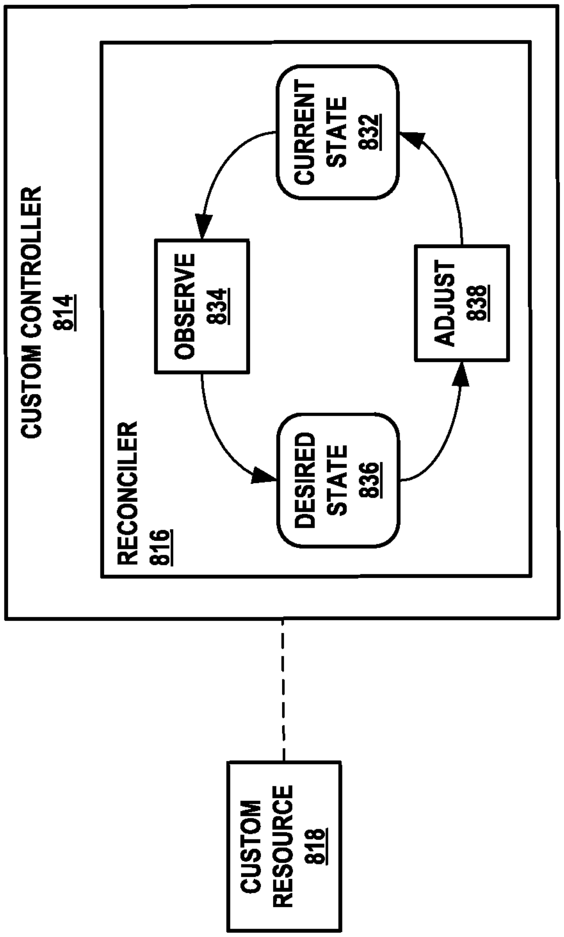
FIG. 6 is a block diagram illustrating an example of a custom controller for custom resource(s), according to techniques of this disclosure.

API server 300 is extended with Readiness 62 and Readiness Test 63 custom resources, defined using CRDs. Readiness controller 249 can apply logic to perform a pre-deployment test suite, a post-deployment test suite, and the tests themselves. The test logic is implemented as a reconciliation loop. FIG. 6 is a block diagram illustrating an example of a custom controller for custom resource(s) for pre-deployment and post-deployment testing, according to techniques of this disclosure. Customer controller 814 may represent an example instance of readiness controller 249. In the example illustrated in FIG. 6, custom controller 814 can be associated with custom resource 818. Custom controller 814 can include reconciler 816 that includes logic to execute a reconciliation loop in which custom controller 814 observes 834 (e.g., monitors) a current state 832 of custom resource 818. In response to determining that a desired state 836 does not match a current state 832, reconciler 816 can perform actions to adjust 838 the state of the custom resource such that the current state 832 matches the desired state 836. A request may be received by API server 300 to change the current state 832 of custom resource 818 to desired state 836.

In the case that an API request is a create request for a custom resource, reconciler 816 can act on the create event for the instance data for the custom resource. Reconciler 816 may create instance data for custom resources that the requested custom resource depends on.

By default, custom resource controllers 302 are running an active-passive mode and consistency is achieved using master election. When a controller pod starts it tries to create a ConfigMap resource in KUBERNETES using a specified key. If creation succeeds, that pod becomes master and starts processing reconciliation requests; otherwise it blocks trying to create ConfigMap in an endless loop.

Configuration store(s) 224 may be implemented as etcd. Etcd is a consistent and highly available key value store used as the KUBERNETES backing store for cluster data.

Figure 4:
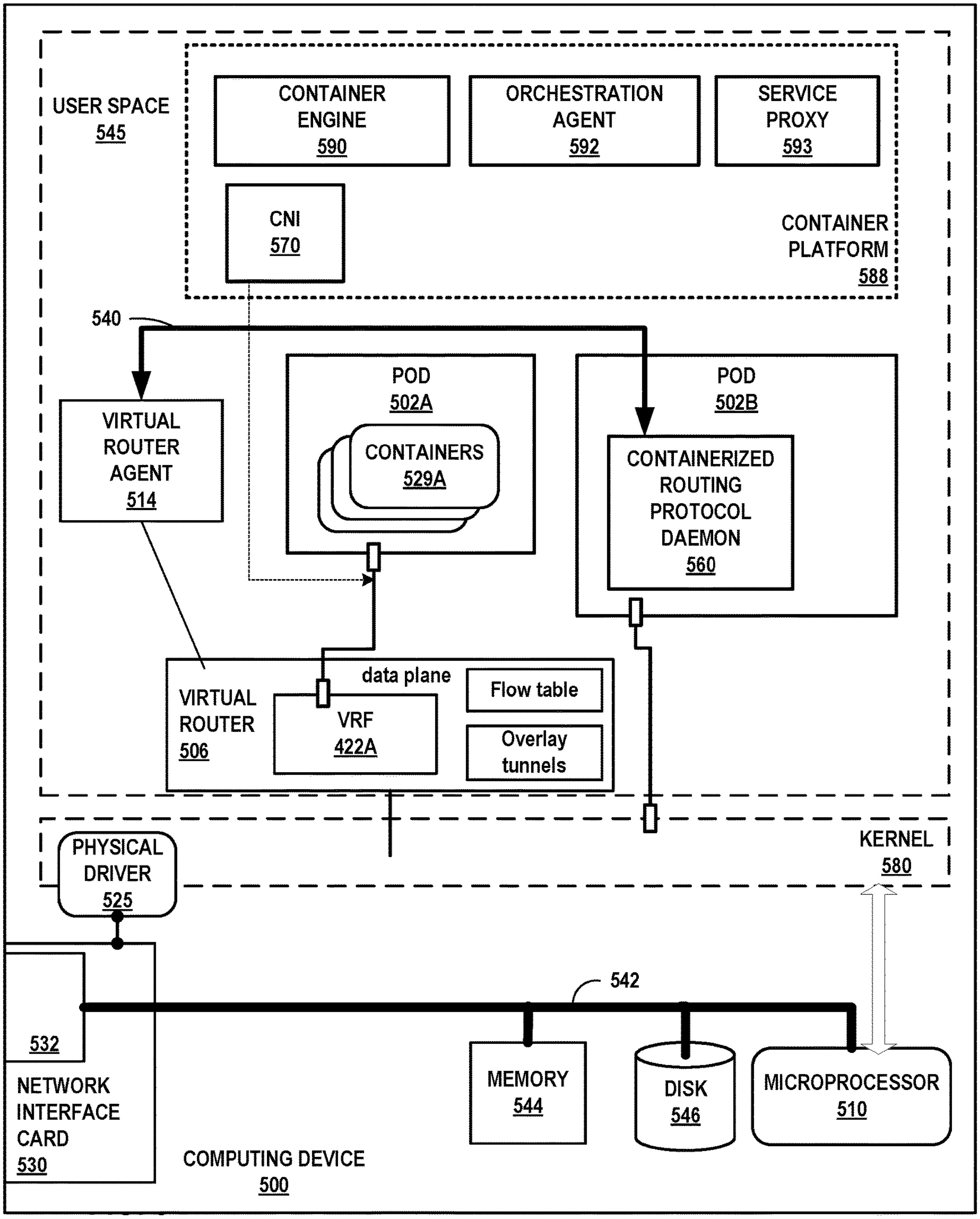
FIG. 4 is a block diagram of an example computing device, according to techniques described in this disclosure.

FIG. 4 is a block diagram of an example computing device, according to techniques described in this disclosure. Computing device 500 of FIG. 4 may represent a real or virtual server and may represent an example instance of any of servers 12 and may be referred to as a compute node, master/minion node, or host. Computing device 500 includes in this example, a bus 542 coupling hardware components of a computing device 500 hardware environment. Bus 542 couples network interface card (NIC) 530, memory 544, storage disk 546, and one or more microprocessors 210 (hereinafter, "microprocessor 510"). NIC 530 may be SR-IOV-capable. A front-side bus may in some cases couple microprocessor 510 and memory device 544. In some examples, bus 542 may couple memory device 544, microprocessor 510, and NIC 530. Bus 542 may represent a Peripheral Component Interface (PCI) express (PCIe) bus. In some examples, a direct memory access (DMA) controller may control DMA transfers among components coupled to bus 542. In some examples, components coupled to bus 542 control DMA transfers among components coupled to bus 542.

Microprocessor 510 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 546 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 510.

Main memory 544 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 544 provides a physical address space composed of addressable memory locations.

Network interface card (NIC) 530 includes one or more interfaces 532 configured to exchange packets using links of an underlying physical network. Interfaces 532 may include a port interface card having one or more network ports. NIC 530 may also include an on-card memory to, e.g., store packet data. Direct memory access transfers between the NIC 530 and other devices coupled to bus 542 may read/write from/to the NIC memory.

Memory 544, NIC 530, storage disk 546, and microprocessor 510 may provide an operating environment for a software stack that includes an operating system kernel 580 executing in kernel space. Kernel 580 may represent, for example, a LINUX, Berkeley Software Distribution (BSD), another UNIX ("Unix")-variant kernel, or a WINDOWS ("Windows") server operating system kernel, available from Microsoft Corp. In some instances, the operating system may execute a hypervisor and one or more virtual machines managed by the hypervisor. Example hypervisors include Kernel-based Virtual Machine (KVM) for the LINUX kernel, Xen, ESXi available from VMWARE, WINDOWS Hyper-V available from Microsoft Corp, and other open-source and proprietary hypervisors. The term hypervisor can encompass a virtual machine manager (VMM). An operating system that includes kernel 580 provides an execution environment for one or more processes in user space 545.

Kernel 580 includes a physical driver 525 to use the network interface card 530. Network interface card 530 may also implement SR-IOV to enable sharing the physical network function (I/O) among one or more virtual execution elements, such as containers 529A or one or more virtual machines (not shown in FIG. 4). Shared virtual devices such as virtual functions may provide dedicated resources such that each of the virtual execution elements may access dedicated resources of NIC 530, which therefore appears to each of the virtual execution elements as a dedicated NIC. Virtual functions may represent lightweight PCIe functions that share physical resources with a physical function used by physical driver 525 and with other virtual functions. For an SR-IOV-capable NIC 530, NIC 530 may have thousands of available virtual functions according to the SR-IOV standard, but for I/O-intensive applications the number of configured virtual functions is typically much smaller.

Computing device 500 may be coupled to a physical network switch fabric that includes an overlay network that extends switch fabric from physical switches to software or "virtual" routers of physical servers coupled to the switch fabric, including virtual router 506. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a LINUX bridge, DOCKER bridge, or other device and/or software that is located on a host device and performs switching, bridging, or routing packets among virtual network endpoints of one or more virtual networks, where the virtual network endpoints are hosted by one or more of servers 12. In the example computing device 500 of FIG. 4, virtual router 506 executes within user space as a DPDK-based virtual router, but virtual router 506 may execute within a hypervisor, a host operating system, a host application, or a virtual machine in various implementations.

Virtual router 506 may replace and subsume the virtual routing/bridging functionality of the LINUX bridge/OVS module that is commonly used for KUBERNETES deployments of pods 502. Virtual router 506 may perform bridging (e.g., E-VPN) and routing (e.g., L3VPN, IP-VPNs) for virtual networks. Virtual router 506 may perform networking services such as applying security policies, NAT, multicast, mirroring, and load balancing.

Virtual router 506 can be executing as a kernel module or as a user space DPDK process (virtual router 506 is shown here in user space 545). Virtual router agent 514 may also be executing in user space. In the example computing device 500, virtual router 506 executes within user space as a DPDK-based virtual router, but virtual router 506 may execute within a hypervisor, a host operating system, a host application, or a virtual machine in various implementations. Virtual router agent 514 has a connection to network controller 24 using a channel, which is used to download configurations and forwarding information. Virtual router agent 514 programs this forwarding state to the virtual router data (or "forwarding") plane represented by virtual router 506. Virtual router 506 and virtual router agent 514 may be processes. Virtual router 506 and virtual router agent 514 may be containerized/cloud-native, though they are not illustrated as contained in a Pod.

Virtual router 506 may replace and subsume the virtual routing/bridging functionality of the LINUX bridge/OVS module that is commonly used for KUBERNETES deployments of pods 502. Virtual router agent 514 may communicate with containerized routing protocol daemon (cRPD) 560 of 502B over connection 540. Virtual router 506 may perform bridging (e.g., E-VPN) and routing (e.g., L3VPN, IP-VPNs) for virtual networks. Virtual router 506 may perform networking services such as applying security policies, NAT, multicast, mirroring, and load balancing.

Virtual router 506 may be multi-threaded and execute on one or more processor cores. Virtual router 506 may include multiple queues. Virtual router 506 may implement a packet processing pipeline. The pipeline can be stitched by the virtual router agent 514 from the simplest to the most complicated manner depending on the operations to be applied to a packet. Virtual router 506 may maintain multiple instances of forwarding bases. Virtual router 506 may access and update tables using RCU (Read Copy Update) locks.

To send packets to other compute nodes or switches, virtual router 506 uses one or more physical interfaces 532. In general, virtual router 506 exchanges overlay packets with workloads, such as VMs or pods 502. Virtual router 506 has multiple virtual network interfaces (e.g., vifs). These interfaces may include the kernel interface, vhost0, for exchanging packets with the host operating system; an interface with virtual router agent 514, pkt0, to obtain forwarding state from the network controller and to send up exception packets. There may be one or more virtual network interfaces corresponding to the one or more physical network interfaces 532. Other virtual network interfaces of virtual router 506 are for exchanging packets with the workloads.

In general, each of pods 502A-502B may be assigned one or more virtual network addresses for use within respective virtual networks, where each of the virtual networks may be associated with a different virtual subnet provided by virtual router 506. Pod 502B may be assigned its own virtual layer three (L3) IP address, for example, for sending and receiving communications but may be unaware of an IP address of the computing device 500 on which the pod 502B executes. The virtual network address may thus differ from the logical address for the underlying, physical computer system, e.g., computing device 500.

Computing device 500 includes a virtual router agent 514 that controls the overlay of virtual networks for computing device 500 and that coordinates the routing of data packets within computing device 500. In general, virtual router agent 514 communicates with network controller 24 for the virtualization infrastructure, which generates commands to create virtual networks and configure network virtualization endpoints, such as computing device 500 and, more specifically, virtual router 506, as a well as virtual network interface 212. By configuring virtual router 506 based on information received from network controller 24, virtual router agent 514 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 529A-529B within the virtual network domain may be encapsulated in another packet (e.g., another IP or Ethernet packet) that is transported by the physical network. The packet transported in a virtual network may be referred to herein as an “inner packet” while the physical network packet may be referred to herein as an “outer packet” or a “tunnel packet.” Encapsulation and/or de-capsulation of virtual network packets within physical network packets may be performed by virtual router 506. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 506 performs tunnel encapsulation/decapsulation for packets sourced by/destined to any containers of pods 502, and virtual router 506 exchanges packets with pods 502 via bus 542 and/or a bridge of NIC 530.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 506 implements one or more virtual routing and forwarding instances (VRFs), such as VRF 422A, for respective virtual networks for which virtual router 506 operates as respective tunnel endpoints. In general, each of the VRFs stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of the VRFs may include a network forwarding table storing routing and forwarding information for the virtual network.

NIC 530 may receive tunnel packets. Virtual router 506 processes the tunnel packet to determine, from the tunnel encapsulation header, the virtual network of the source and destination endpoints for the inner packet. Virtual router 506 may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 422A. VRF 422A may include forwarding information for the inner packet. For instance, VRF 422A may map a destination layer 3 address for the inner packet to virtual network interface 212. VRF 422A forwards the inner packet via virtual network interface 212 to pod 502A in response.

Containers 529A may also source inner packets as source virtual network endpoints. Container 529A, for instance, may generate a layer 3 inner packet destined for a destination virtual network endpoint that is executed by another computing device (i.e., not computing device 500) or for another one of containers. Container 529A may sends the layer 3 inner packet to virtual router 506 via the virtual network interface attached to VRF 422A.

Virtual router 506 receives the inner packet and layer 2 header and determines a virtual network for the inner packet. Virtual router 506 may determine the virtual network using any of the above-described virtual network interface implementation techniques (e.g., macvlan, veth, etc.). Virtual router 506 uses the VRF 422A corresponding to the virtual network for the inner packet to generate an outer header for the inner packet, the outer header including an outer IP header for the overlay tunnel and a tunnel encapsulation header identifying the virtual network. Virtual router 506 encapsulates the inner packet with the outer header. Virtual router 506 may encapsulate the tunnel packet with a new layer 2 header having a destination layer 2 address associated with a device external to the computing device 500, e.g., a TOR switch 16 or one of servers 12. If external to computing device 500, virtual router 506 outputs the tunnel packet with the new layer 2 header to NIC 530 using physical function 221. NIC 530 outputs the packet on an outbound interface. If the destination is another virtual network endpoint executing on computing device 500, virtual router 506 routes the packet to the appropriate one of virtual network interfaces 212, 213.

In some examples, a controller for computing device 500 (e.g., network controller 24 of FIG. 1) configures a default route in each of pods 502 to cause the virtual machines 224 to use virtual router 506 as an initial next hop for outbound packets. In some examples, NIC 530 is configured with one or more forwarding rules to cause all packets received from virtual machines 224 to be switched to virtual router 506.

Pod 502A includes one or more application containers 529A. Pod 502B includes an instance of containerized routing protocol daemon (cRPD) 560. Container platform 588 includes container runtime 590, orchestration agent 592, service proxy 593, and CNI 570.

Container engine 590 includes code executable by microprocessor 510. Container runtime 590 may be one or more computer processes. Container engine 590 runs containerized applications in the form of containers 529A-529B. Container engine 590 may represent a DOCKER, rkt, or other container engine for managing containers. In general, container engine 590 receives requests and manages objects such as images, containers, networks, and volumes. An image is a template with instructions for creating a container. A container is an executable instance of an image. Based on directives from controller agent 592, container engine 590 may obtain images and instantiate them as executable containers in pods 502A-502B.

Service proxy 593 includes code executable by microprocessor 510. Service proxy 593 may be one or more computer processes. Service proxy 593 monitors for the addition and removal of service and endpoints objects, and it maintains the network configuration of the computing device 500 to ensure communication among pods and containers, e.g., using services. Service proxy 593 may also manage iptables to capture traffic to a service's virtual IP address and port and redirect the traffic to the proxy port that proxies a backed pod. Service proxy 593 may represent a kube-proxy for a minion node of a KUBERNETES cluster. In some examples, container platform 588 does not include a service proxy 593 or the service proxy 593 is disabled in favor of configuration of virtual router 506 and pods 502 by CNI 570.

Orchestration agent 592 includes code executable by microprocessor 510. Orchestration agent 592 may be one or more computer processes. Orchestration agent 592 may represent a kubelet for a minion node of a KUBERNETES cluster. Orchestration agent 592 is an agent of an orchestrator, e.g., orchestrator 23 of FIG. 1, that receives container specification data for containers and ensures the containers execute by computing device 500. Container specification data may be in the form of a manifest file sent to orchestration agent 592 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 502 of containers. Based on the container specification data, orchestration agent 592 directs container engine 590 to obtain and instantiate the container images for containers 529, for execution of containers 529 by computing device 500.

Orchestration agent 592 instantiates or otherwise invokes CNI 570 to configure one or more virtual network interfaces for each of pods 502. For example, orchestration agent 592 receives a container specification data for pod 502A and directs container engine 590 to create the pod 502A with containers 529A based on the container specification data for pod 502A. Orchestration agent 592 also invokes the CNI 570 to configure, for pod 502A, virtual network interface for a virtual network corresponding to VRFs 422A. In this example, pod 502A is a virtual network endpoint for a virtual network corresponding to VRF 422A.

CNI 570 may obtain interface configuration data for configuring virtual network interfaces for pods 502. Virtual router agent 514 operates as a virtual network control plane module for enabling network controller 24 to configure virtual router 506. Unlike the orchestration control plane (including the container platforms 588 for minion nodes and the master node(s), e.g., orchestrator 23), which manages the provisioning, scheduling, and managing virtual execution elements, a virtual network control plane (including network controller 24 and virtual router agent 514 for minion nodes) manages the configuration of virtual networks implemented in the data plane in part by virtual routers 506 of the minion nodes. Virtual router agent 514 communicates, to CNI 570, interface configuration data for virtual network interfaces to enable an orchestration control plane element (i.e., CNI 570) to configure the virtual network interfaces according to the configuration state determined by the network controller 24, thus bridging the gap between the orchestration control plane and virtual network control plane. In addition, this may enable a CNI 570 to obtain interface configuration data for multiple virtual network interfaces for a pod and configure the multiple virtual network interfaces, which may reduce communication and resource overhead inherent with invoking a separate CNI 570 for configuring each virtual network interface.

Figure 5:
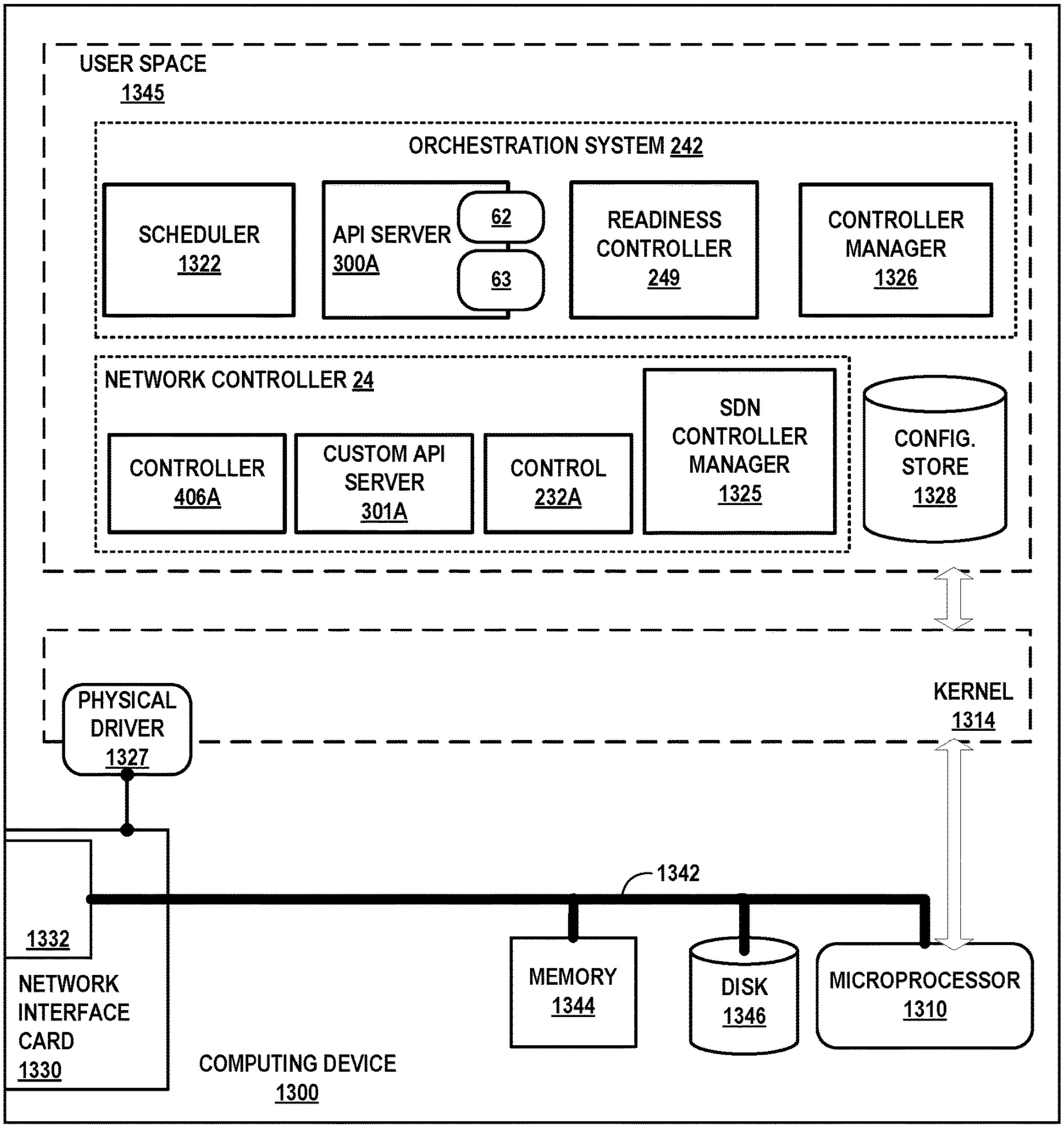
FIG. 5 is a block diagram of an example computing device operating as a compute node for one or more clusters for a containerized SDN architecture system, in accordance with techniques of this disclosure.

FIG. 5 is a block diagram of an example computing device operating as a compute node for a computing system of one or more clusters for an SDN architecture system, in accordance with techniques of this disclosure. Computing device 1300 may represent one or more real or virtual servers. Computing device 1300 may in some instances implement one or more master nodes for respective clusters, or for multiple clusters.

Scheduler 1322, API server 300A, custom API server 301A, controller 406A, readiness controller 249, controller manager 1326, SDN controller manager 1325, control node 232A, and configuration store 1328, are components of the SDN architecture system and, although illustrated and described as being executed by a single computing device 1300, may be distributed among multiple computing devices that make up a computing system or hardware/server cluster. Each of the multiple computing devices, in other words, may provide a hardware operating environment for one or more instances of any one or more of scheduler 1322, API server 300A, custom API server 301A, controller 406A, readiness controller 249, controller manager 1326, SDN controller manager 1325, control node 232A, or configuration store 1328.

Computing device 1300 includes in this example, a bus 1342 coupling hardware components of a computing device 1300 hardware environment. Bus 1342 couples network interface card (NIC) 1330, storage disk 1346, and one or more microprocessors 1310 (hereinafter, "microprocessor 1310"). A front-side bus may in some cases couple microprocessor 1310 and memory device 1344. In some examples, bus 1342 may couple memory device 1344, microprocessor 1310, and NIC 1330. Bus 1342 may represent a Peripheral Component Interface (PCI) express (PCIe) bus. In some examples, a direct memory access (DMA) controller may control DMA transfers among components coupled to bus 242. In some examples, components coupled to bus 1342 control DMA transfers among components coupled to bus 1342. Network interface card (NIC) 1330 includes one or more interfaces 1332 configured to exchange packets using links of an underlying physical network.

Microprocessor 1310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 1346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 1310.

Main memory 1344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 1344 provides a physical address space composed of addressable memory locations.

Network interface card (NIC) 1330 includes one or more interfaces 1332 configured to exchange packets using links of an underlying physical network. Interfaces 1332 may include a port interface card having one or more network ports. NIC 1330 may also include an on-card memory to, e.g., store packet data. Direct memory access transfers between the NIC 1330 and other devices coupled to bus 1342 may read/write from/to the NIC memory.

Memory 1344, NIC 1330, storage disk 1346, and microprocessor 1310 may provide an operating environment for a software stack that includes an operating system kernel 1314 executing in kernel space. Kernel 1314 may represent, for example, a LINUX, Berkeley Software Distribution (BSD), another UNIX-variant kernel, or a WINDOWS server operating system kernel, available from Microsoft Corp. In some instances, the operating system may execute a hypervisor and one or more virtual machines managed by hypervisor. Example hypervisors include Kernel-based Virtual Machine (KVM) for the LINUX kernel, Xen, ESXi available from VMWARE, WINDOWS Hyper-V available from Microsoft Corp., and other open-source and proprietary hypervisors. The term hypervisor can encompass a virtual machine manager (VMM). An operating system that includes kernel 1314 provides an execution environment for one or more processes in user space 1345. Kernel 1314 includes a physical driver 1327 to use the network interface card 230.

Computing device 1300 may be coupled to a physical network switch fabric that includes an overlay network that extends switch fabric from physical switches to software or virtual routers of physical servers coupled to the switch fabric, such virtual routers 21. Computing device 1300 may use one or more dedicated virtual networks to configure minion nodes of a cluster.

Scheduler 1322, API server 300A, custom API server 301A, controller 406A, readiness controller 249, controller manager 1326, SDN controller manager 1325, control node 232A, and configuration store 1328 may implement a master node for a cluster and be alternatively referred to as "master components." The cluster may be a KUBERNETES cluster and the master node a KUBERNETES master node, in which case the master components are KUBERNETES master components.

Each of scheduler 1322, API server 300A, custom API server 301A, controller 406A, readiness controller 249, controller manager 1326, SDN controller manager 1325, control node 232A includes code executable by microprocessor 1310. Custom API server 301A validates and configures data for custom resources for SDN architecture configuration, as described in U.S. patent application Ser. No. 17/657,596, incorporated by reference above. A service may be an abstraction that defines a logical set of pods and the policy used to access the pods. The set of pods implementing a service are selected based on the service definition. A service may be implemented in part as, or otherwise include, a load balancer. API server 300A and custom API server 301A may implement a Representational State Transfer (REST) interface to process REST operations and provide the frontend, as part of the configuration plane for an SDN architecture, to a corresponding cluster's shared state stored to configuration store 1328. API server 300A may represent a KUBERNETES API server.

Configuration store 1328 is a backing store for all cluster data. Cluster data may include cluster state and configuration data. Configuration data may also provide a backend for service discovery and/or provide a locking service. Configuration store 1328 may be implemented as a key value store. Configuration store 1328 may be a central database or distributed database. Configuration store 1328 may represent an etcd store. Configuration store 1328 may represent a KUBERNETES configuration store.

Scheduler 1322 includes code executable by microprocessor 1310. Scheduler 1322 may be one or more computer processes. Scheduler 1322 monitors for newly created or requested virtual execution elements (e.g., pods of containers) and selects a minion node on which the virtual execution elements are to run. Scheduler 1322 may select a minion node based on resource requirements, hardware constraints, software constraints, policy constraints, locality, etc. Scheduler 1322 may represent a KUBERNETES scheduler.

In general, API server 1320 may invoke the scheduler 1322 to schedule a pod. Scheduler 1322 may select a minion node and returns an identifier for the selected minion node to API server 1320, which may write the identifier to the configuration store 1328 in association with the pod. API server 1320 may invoke the orchestration agent 310 for the selected minion node, which may cause the container engine 208 for the selected minion node to obtain the pod from a storage server and create the virtual execution element on the minion node. The orchestration agent 310 for the selected minion node may update the status for the pod to the API server 1320, which persists this new state to the configuration store 1328. In this way, computing device 1300 instantiates new pods in the computing system 8.

Controller manager 1326 includes code executable by microprocessor 1310. Controller manager 1326 may be one or more computer processes. Controller manager 1326 may embed the core control loops, monitoring a shared state of a cluster by obtaining notifications from API Server 1320. Controller manager 1326 may attempt to move the state of the cluster toward the desired state. Example controller 406A and custom resource controller 302A may be managed by the controller manager 1326. Other controllers may include a replication controller, endpoints controller, namespace controller, and service accounts controller. Controller manager 1326 may perform lifecycle functions such as namespace creation and lifecycle, event garbage collection, terminated pod garbage collection, cascading-deletion garbage collection, node garbage collection, etc. Controller manager 1326 may represent a KUBERNETES Controller Manager for a KUBERNETES cluster.

SDN controller manager 1325 may operate as an interface between KUBERNETES core resources (Service, Namespace, Pod, Network Policy, Network Attachment Definition) and the extended SDN architecture resources (VirtualNetwork, RoutingInstance etc.). SDN controller manager 1325 watches the KUBERNETES API for changes on both KUBERNETES core and the custom resources for SDN architecture configuration and, as a result, can perform CRUD operations on the relevant resources.

In some examples, SDN controller manager 1325 is a collection of one or more KUBERNETES custom controllers. In some examples, in single or multi-cluster deployments, SDN controller manager 1325 may run on the KUBERNETES cluster(s) it manages.

SDN controller manager 1325 listens to the following KUBERNETES objects for Create, Delete, and Update events:

Pod
Service
NodePort
Ingress
Endpoint
Namespace
Deployment
Network Policy

When these events are generated, SDN controller manager 1325 creates appropriate SDN architecture objects, which are in turn defined as custom resources for SDN architecture configuration. In response to detecting an event on an instance of a custom resource, whether instantiated by SDN controller manager 1325 and/or through custom API server 301, control node 232A obtains configuration data for the instance for the custom resource and configures a corresponding instance of a configuration object in SDN architecture 400.

For example, SDN controller manager 1325 watches for the Pod creation event and, in response, may create the following SDN architecture objects: VirtualMachine (a workload/pod), VirtualMachineInterface (a virtual network interface), and an InstanceIP (IP address). Control nodes 232A may then instantiate the SDN architecture objects, in this case, in a selected compute node.

Figure 7A:
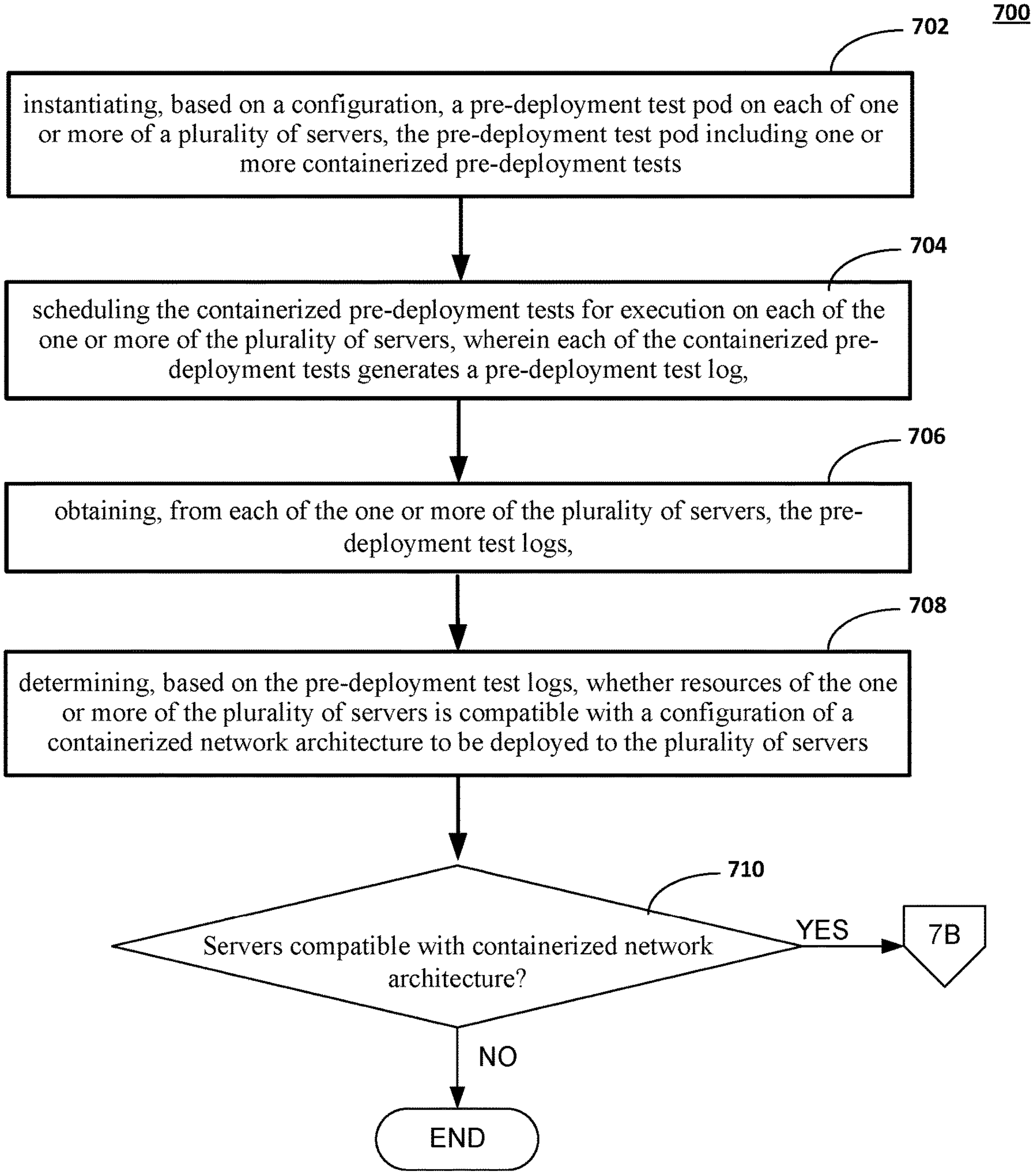
FIGS. 7A and 7B are a flowchart illustrating example operations for performing pre-deployment and post-deployment checks for a containerized SDN architecture system, according to techniques of this disclosure.
Figure 7B:
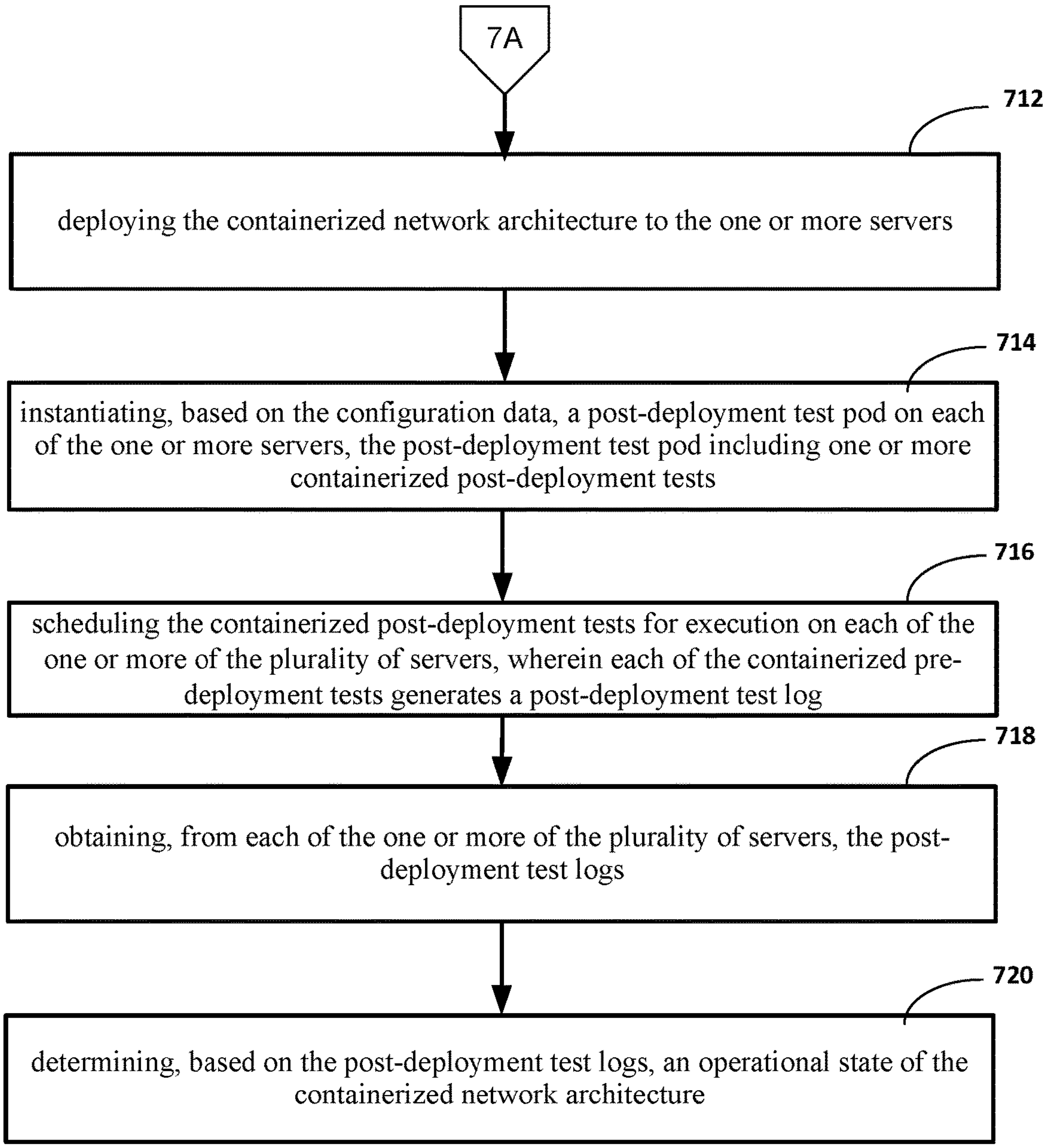

FIGS. 7A and 7B are a flowchart illustrating an example mode of operations for performing pre-deployment and post-deployment checks for a software-defined networking architecture system, according to techniques of this disclosure. The operations of the method 700 may be performed, in part, by a readiness controller 249. Readiness controller 249 instantiates, based on a configuration, a pre-deployment test pod on each of one or more of a plurality of servers, the pre-deployment test pod including one or more containerized pre-deployment tests (702). Readiness controller 249 schedules the containerized pre-deployment tests for execution on each of the one or more of the plurality of servers, wherein each of the containerized pre-deployment tests generates a pre-deployment test log (704). Readiness controller 249 obtains, from each of the one or more of the plurality of servers, the pre-deployment test logs (706). The pre-deployment test pods may stream log data for the readiness tests to a logging system, from which readiness controller 249 may obtain the logs.

Readiness controller 249 determines, based on the pre-deployment test logs, whether resources of the one or more of the plurality of servers is compatible with a configuration of a containerized network architecture to be deployed to the plurality of servers (708). In response to determining that the one or more servers are compatible with the configuration of the containerized network architecture ("YES" branch of 710), Readiness controller 249 deploys the containerized network architecture to the one or more servers (712), instantiates, based on the configuration data, a post-deployment test pod on each of the one or more servers, the post-deployment test pod including one or more containerized post-deployment tests (714), schedules the containerized post-deployment tests for execution on each of the one or more of the plurality of servers, wherein each of the containerized pre-deployment tests generates a post-deployment test log (716), obtains, from each of the one or more of the plurality of servers, the post-deployment test logs (718), and determines, based on the post-deployment test logs, an operational state of the containerized network architecture (720).

Aspects described in this disclosure include a testing scheme in which Custom Resources (CRs) are (1) tasked with first validating a cluster as suitable for network controller/network data plane/CNI workloads specifically (as opposed to other types of containerized applications) [pre-deployment checks of a pre-deployment test suite], (2) and also tasked with subsequently validating the network controller/network data plane/CNI deployment on the cluster to validate the network controller/CNI and readiness of the cluster, including networking, for application workloads [post-deployment checks of a post-deployment test suite]. The SDN architecture system described herein is an example of a network controller/network data plane/CNI. Because the SDN architecture system components to be deployed are needed to operate as the CNI for the cluster to support further applications, conventional methods for verifying application workload that have been deployed are not able to account for and validate this earlier deployment of the network controller/network data plane/CNI. By performing pre- and post-deployment checks as part of the SDN architecture system deployment, the techniques provide a technical improvement that realizes one or more practical application in the area of application orchestration and management.

Figure 8:
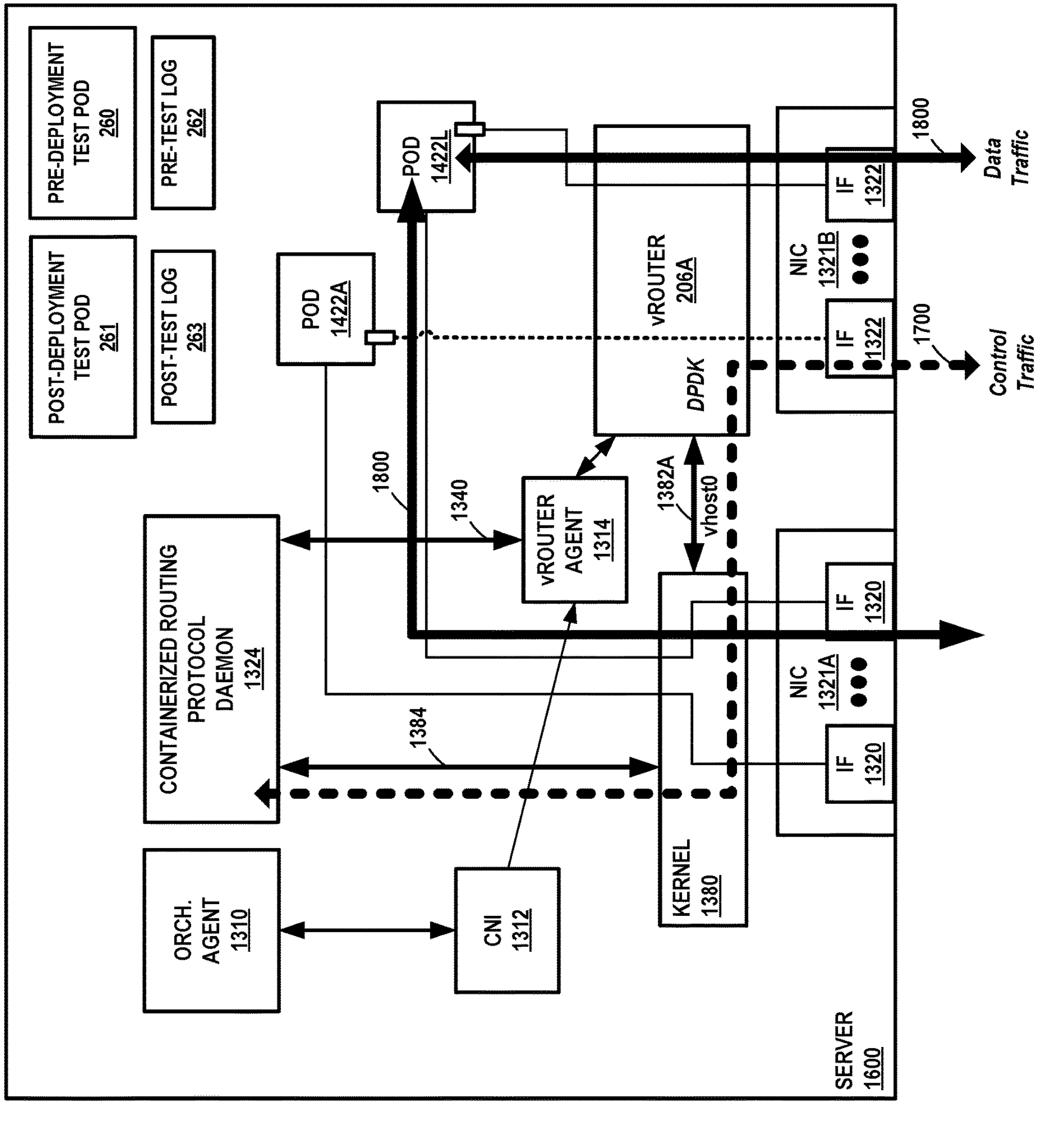
FIG. 8 is a block diagram illustrating a server implementing a containerized network router, with respective to which one or more techniques of this disclosure may be applied.

FIG. 8 is a block diagram illustrating a server implementing a containerized network router, with respect to which one or more techniques of this disclosure may be applied. Server 1600 may include hardware components similar to other servers described herein, including NICs 1321A and 1321B, which may be similar to previously-described NIC 530 and/or NIC 1330. Containerized routing protocol daemon (cRPD) 1324 is a routing protocol process that operates as the control plane for a router implemented by server 1600, and DPDK-based vRouter 1206A operates as the fast path forwarding plane for the router. PODs 1422A-1422L are endpoints from the perspective of vRouter 1206A, and in particular may represent overlay endpoints for one or more virtual networks that have been programmed into vRouter 1206A. A single vhost interface, vhost0 interface 1382A, is exposed by vRouter 1206A to kernel 1380 and in some cases by kernel 1380 to vRouter 1206A. vhost interface 1382A has an associated underlay host IP address for receiving traffic "at the host". Thus, kernel 1380 may be a network endpoint of the underlay network that includes server 1600 as a network device, the network endpoint having the IP address of vhost interface 1382A. The application layer endpoint may be cRPD 1324 or other process managed by kernel 1380.

Underlay networking refers to the physical infrastructure that provides connectivity between nodes (typically servers) in the network. The underlay network is responsible for delivering packets across the infrastructure. Network devices of the underlay use routing protocols to determine IP connectivity. Typical routing protocols used on the underlay network devices for routing purposes are OSPF, IS-IS, and BGP. Overlay networking refers to the virtual infrastructure that provides connectivity between virtual workloads (typically VMs/pods). This connectivity is built on top of the underlay network and permits the construction of virtual networks. The overlay traffic (i.e., virtual networking) is usually encapsulated in IP/MPLS tunnels or other tunnels, which are routed by the underlay network. Overlay networks can run across all or a subset of the underlay network devices and achieve multi-tenancy via virtualization.

Control traffic 1700 may represent routing protocol traffic for one or more routing protocols executed by cRPD 1324. In server 1600, control traffic 1700 may be received over a physical interface 1322 owned by vRouter 1206A. vRouter 1206A is programmed with a route for the vhost0 interface 1382A host IP address along with a receive next hop, which causes vRouter 1206A to send traffic, received at the physical interface 1322 and destined to the vhost0 interface 1382A host IP address, to kernel 1380 via vhost0 interface 1382A. From the perspective of cRPD 1324 and kernel 1380, all such control traffic 1700 would appear to come from vhost0 interface 1382A. Accordingly, cRPD 1324 routes will specify vhost0 interface 1382A as the forwarding next hop for the routes. cRPD 1324 selectively installs some routes to vRouter agent 1314 and the same (or other) routes to kernel 1380 (see, e.g., interaction 1384), as described in further detail below. vRouter agent 1314 will receive a forwarding information base (FIB) update corresponding to some routes received by cRPD 1324 (see, e.g., interaction 1384). These routes will point to vHost0 interface 1382A and vRouter 1206A may automatically translate or map vHost0 interface 1382A to a physical interface 1322.

Routing information programmed by cRPD 1324 can be classified into underlay and overlay. cRPD 1324 will install the underlay routes to kernel 1380, because cRPD 1324 might need that reachability to establish additional protocols adjacencies/sessions with external routers, e.g., BGP multi-hop sessions over reachability provided by IGPs. cRPD 1324 supports selective filtering of FIB updates to specific data planes, e.g., to kernel 1380 or vRouter 1206A using routing policy constructs that allow for matching against RIB, routings instance, prefix, or other property.

Control traffic 1700 sent by cRPD 1324 to vRouter 1206A over vhost0 interface 1382A may be sent by vRouter 1206A out the corresponding physical interface 1322 for vhost0 interface 1382A.

As shown, cRPD-based CNI 1312 will create the virtual network (here, "pod") interfaces for each of the application pods 1422A, 1422L on being notified by the orchestrator 50 via orchestration agent 1310. One end of a pod interface terminates in a container included in the pod. CNI 1312 may request vRouter 1206A to start monitoring the other end of the pod interface, and cRPD 1324 facilitates traffic from the physical interfaces 1322 destined for application containers in DPDK-based pods 1422A, 1422L to be forwarded using DPDK, exclusively, and without involving kernel 1380. The reverse process applies for traffic sourced by pods 1422A, 1422L.

However, because DPDK-based vRouter 1206A manages these the virtual network interfaces for pods 1422A, 1422L, the virtual network interfaces are not known to kernel 1380. Server 1600 may use tunnels exclusive to the DPDK forwarding path to send and receive overlay data traffic 1800 internally among DPDK-based pods 1422A, 1422L; vRouter 1206A; and NIC 1312B.

As such, in server 1600, cRPD 1324 interfaces with two disjoint data planes: kernel 1380 and the DPDK-based vRouter 1206A. cRPD 1324 leverages the kernel 1380 networking stack to setup routing exclusively for the DPDK fast path. The routing information cRPD 1324 receives includes underlay routing information and overlay routing information. cRPD 1324 runs routing protocols on vHost interface 1382A that is visible in kernel 1380, and cRPD 1324 may install FIB updates corresponding to IGP-learnt routes (underlay routing information) in the kernel 1380 FIB. This may enable establishment of multi-hop iBGP sessions to those destinations indicated in such IGP-learnt routes. Again, the cRPD 1324 routing protocol adjacencies involve kernel 1380 (and vHost interface 1382A) because kernel 1380 executes the networking stack.

vRouter agent 1314 for vRouter 1206A notifies cRPD 1324A about the application pod interfaces for pods 1422A, 1422L. These pod interfaces are created by CNI 1312 and managed exclusively (i.e., without involvement of kernel 1380) by the vRouter agent 1314. These pod interfaces are not known to the kernel 1380. cRPD 1324 may advertise reachability to these pod interfaces to the rest of the network as L3VPN routes including Network Layer Reachability Information (NLRI). In the 5G mobile network context, such L3VPN routes may be stored in VRFs of vRouter 1206A for different network slices. The corresponding MPLS routes may be programmed by cRPD 1324 only to vRouter 1206A, via interface 340 with vRouter agent 1314, and not to kernel 1380. That is so because the next-hop of these MPLS labels is a pop-and-forward to a pod interface for one of pods 1422A, 1422L; these interfaces are only visible in vRouter 1206A and not kernel 1380. Similarly, reachability information received over BGP L3VPN may be selectively programmed by cRPD 1324 to vRouter 1206A, for such routes are only needed for forwarding traffic generated by pods 1422A, 1422. Kernel 1380 has no application that needs such reachability. The above routes programmed to vRouter 1206A constitute overlay routes for the overlay network.

Techniques described herein, with respect to validating an environment on which to deploy a network controller and network data plane and for verifying the operation network controller and network data plane once deployed, may be applied to a containerized network router (CNR) implemented with cRPD 1324 control plane and containerized virtual router 206A data plane. The techniques may be used to validate the environment on which to deploy cRPD 1324 and virtual router 206A, i.e., that resources of instances of servers 1600 are capable of hosting the CNR. The techniques may be used to verify the operation of the CNR once deployed.

Figure 9:
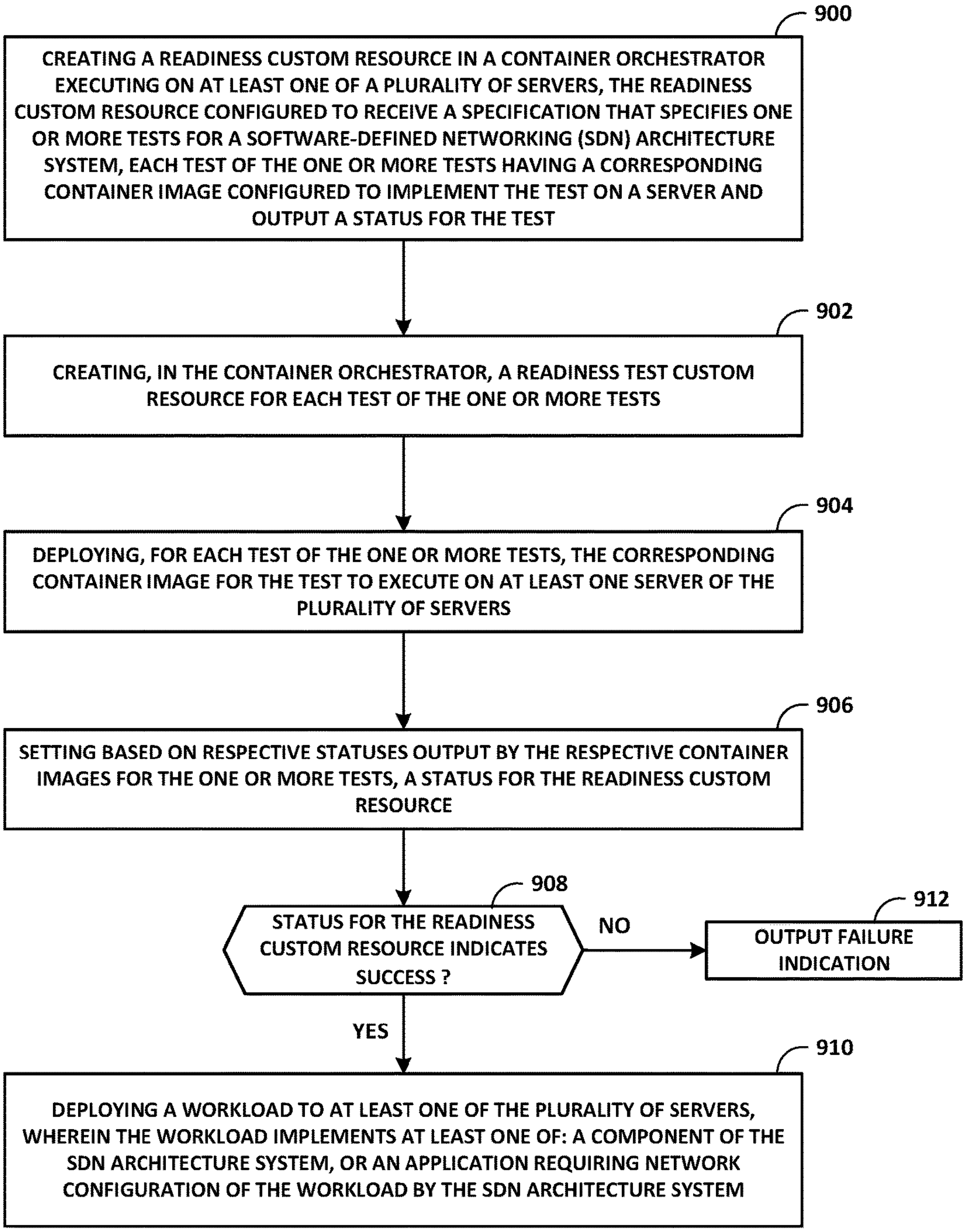
FIG. 9 is a flowchart illustrating an example mode of operation for a computing system that implements an SDN architecture system, in accordance with techniques of this disclosure.

As shown in FIG. 8, pre-deployment test pod 260 and post-deployment test pod 261 may be deployed by the orchestrator using customer resources, Readiness 62 and Readiness Test 63, according to one or more application readiness specifications. The particular tests and test containers for instances of Readiness Test 63, deployed to instances of servers 1600, FIG. 9 is a flowchart illustrating an example mode of operation for a computing system that implements an SDN architecture system, in accordance with techniques of this disclosure. Computing system 8 creates a readiness custom resource in container orchestrator 23, the readiness custom resource 62 configured to receive a specification that specifies one or more tests for a software-defined networking (SDN) architecture system 200, each test of the one or more tests having a corresponding container image configured to implement the test on a server and output a status for the test (900). Computing system 8 creates, in container orchestrator 23, a readiness test custom resource 63 for each test of the one or more tests (902). Computing system 8 deploys, for each test of the one or more tests, the corresponding container image for the test to execute on at least one server of a plurality of servers 12 (904). Computing system 8 sets, based on respective statuses output by the respective container images for the one or more tests, a status for the readiness custom resource (906). Computing system 8, based on the status for the readiness custom resource 62 indicating success (YES branch of 908), deploys a workload to at least one of the plurality of servers, wherein the workload implements at least one of: a component of the SDN architecture system, or an application requiring network configuration of the workload by the SDN architecture system (910). If the status for the readiness custom resource 62 does not indicate success (NO branch of 908), computing system 8 outputs an indication of failure (912).

The present disclosure describes the following non-limiting enumerated examples.

Example 1: A system includes a plurality of servers and a container orchestrator executing on the plurality of servers and configured to: create a readiness custom resource in the container orchestrator, the readiness custom resource configured to receive a specification that specifies one or more tests for a containerized software-defined networking (SDN) architecture system, each test of the one or more tests having a corresponding container image configured to implement the test on a server and output a status for the test; create, in the container orchestrator, a readiness test custom resource for each test of the one or more tests; deploy, for each test of the one or more tests, the corresponding container image for the test to execute on at least one server of the plurality of servers; set, based on respective statuses output by the respective container images for the one or more tests, a status for the readiness custom resource; and based on the status for the readiness custom resource indicating success, deploy a workload to at least one of the plurality of servers, wherein the workload implements at least one of a component of the containerized SDN architecture system or an application requiring network configuration by the containerized SDN architecture system.

Example 2: A containerized deployment system includes a plurality of servers, each of the plurality of servers including a memory and processing circuitry; a container platform executing on each of the plurality of servers; and a containerized readiness controller executed by the container platform of a first set of the plurality of servers, the containerized readiness controller configured to: instantiate, based on a configuration, a pre-deployment test pod on each of one or more of the plurality of servers, the pre-deployment test pod including one or more containerized pre-deployment tests, schedule the containerized pre-deployment tests for execution on each of the one or more of the plurality of servers, wherein each of the containerized pre-deployment tests generates a pre-deployment test log, obtain the pre-deployment test logs, determine, based on the pre-deployment test logs, whether resources of the one or more of the plurality of servers are compatible with a configuration of a containerized network architecture, and in response to a determination that the one or more servers are compatible with the configuration of the containerized network architecture: deploy the containerized network architecture to the one or more servers, instantiate, based on the configuration data, a post-deployment test pod on each of the one or more servers, the post-deployment test pod including one or more containerized post-deployment tests, schedule the containerized post-deployment tests for execution on each of the one or more of the plurality of servers, wherein each of the containerized pre-deployment tests generates a post-deployment test log, obtain the post-deployment test logs, and determine, based on the post-deployment test logs, an operational state of the containerized network architecture.

Example 3: A method includes instantiating, based on a configuration, a pre-deployment test pod on each of one or more of a plurality of servers, the pre-deployment test pod including one or more containerized pre-deployment tests, scheduling the containerized pre-deployment tests for execution on each of the one or more of the plurality of servers, wherein each of the containerized pre-deployment tests generates a pre-deployment test log, obtaining, from each of the one or more of the plurality of servers, the pre-deployment test logs, determining, based on the pre-deployment test logs, whether resources of the one or more of the plurality of servers is compatible with a configuration of a containerized network architecture to be deployed to the plurality of servers, and in response to determining that the one or more servers are compatible with the configuration of the containerized network architecture, deploying the containerized network architecture to the one or more servers, instantiating, based on the configuration data, a post-deployment test pod on each of the one or more servers, the post-deployment test pod including one or more containerized post-deployment tests, scheduling the containerized post-deployment tests for execution on each of the one or more of the plurality of servers, wherein each of the containerized pre-deployment tests generates a post-deployment test log, obtaining, from each of the one or more of the plurality of servers, the post-deployment test logs, and determining, based on the post-deployment test logs, an operational state of the containerized network architecture.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:

a plurality of servers;

one or more processors; and a non-transitory storage medium storing instructions executable on the one or more processors to:

create a readiness custom resource in a container orchestrator executable on the one or more processors and that deploy s containers across the plurality of servers, the readiness custom resource being according to a readiness custom resource definition (CRD) and representing a test suite;

deploy a custom controller for the readiness custom resource, the custom controller executable on the one or more processors to listen for events relating to the readiness custom resource including receiving a specification that specifies:

a plurality of tests of the test suite for a software-defined networking (SDN) architecture system, and a plurality of container images to execute respective tests of the plurality of tests and produce statuses of the respective tests, wherein the plurality of tests are to evaluate whether the plurality of servers is suitably configured for deployment of workloads in the SDN architecture system;

create, in the container orchestrator, readiness test custom resources for respective individual tests of the test suite, the readiness test custom resources being according to a readiness test CRD;

deploy, for each test of the plurality of tests represented by the readiness test custom resources, a corresponding container image of the plurality of container images to execute on a server of the plurality of servers;

set, based on the statuses from the plurality of container images, a status for the readiness custom resource; and based on the status for the readiness custom resource indicating success, deploy a workload to at least one of the plurality of servers.

2. The system of claim 1, wherein the SDN architecture system comprises a network controller and a network data plane, and wherein the container orchestrator is to provide a configuration input to the network controller, and the network controller is executable on the one or more processors to operate according to the configuration input.

3. The system of claim 1, wherein each respective test of the plurality of tests specified by the specification includes a reference to a corresponding container image of the plurality of container images.

4. The system of claim 1, wherein a status of a first container image of the plurality of container images is updated based on a respective test performed by a container executed from the first container image.

5. The system of claim 1, wherein the instructions are executable on the one or more processors to:

initiate a reconfiguration of a server of the plurality of servers based on a respective test of the plurality of tests indicating a failure.

6. The system of claim 2, wherein the test suite is a pre-deployment test suite to validate the plurality of servers, and wherein the instructions are executable on the one or more processors to:

implement, using the readiness custom resource and another specification provided to the custom controller, a post-deployment test suite to validate operations of the network controller and the network data plane of the SDN architecture system on the plurality of servers.

7. The system of claim 1, wherein the instructions are executable on the one or more processors to:

initiate, by the custom controller, a plurality of test jobs for performing the plurality of tests on the plurality of servers.

8. The system of claim 7, wherein the specification further specifies respective servers of the plurality of servers on which respective test jobs of the plurality of test jobs are deployed.

9. The system of claim 1, wherein the custom controller to listen for events relating to the readiness test custom resources.

10. A method comprising:

creating, by a computing system comprising one or more hardware processors, a readiness custom resource in a container orchestrator executable on the one or more hardware processors and that deploys containers across a plurality of servers, the readiness custom resource being according to a readiness custom resource definition (CRD) and representing a test suite;

deploying, by the computing system, a custom controller for the readiness custom resource, the custom controller executable on the one or more hardware processors to listen for events relating to the readiness custom resource including receiving a specification that specifies:

a plurality of tests of the test suite for a software-defined networking (SDN) architecture system, and a plurality of container images to execute respective tests of the plurality of tests and produce statuses of the respective tests, wherein the plurality of tests are to evaluate whether the plurality of servers is suitably configured for deployment of workloads in the SDN architecture system;

creating, by the computing system, readiness test custom resources in the container orchestrator, the readiness test custom resources being according to a readiness test CRD and for respective individual tests of the plurality of tests;

deploying, by the computing system for each test of the plurality of tests represented by the readiness test custom resources, a corresponding container image of the plurality of container images to execute on a server of the plurality of servers;

setting, by the computing system based on the statuses from the plurality of container images, a status for the readiness custom resource; and based on the status for the readiness custom resource indicating success, deploying, by the computing system, a workload to at least one of the plurality of servers.

11. The method of claim 10, wherein the SDN architecture system comprises a network controller and a network data plane, and wherein the container orchestrator provides a configuration input to the network controller, and the network controller is executable on the one or more hardware processors and operates according to the configuration input.

12. The method of claim 10, wherein each respective test of the plurality of tests specified by the specification includes a reference to a corresponding container image of the plurality of container images.

13. The method of claim 10, wherein a status of a first container image of the plurality of container images is updated based on a respective test performed by a container executed from the first container image.

14. The method of claim 10, further comprising:

initiating, by the computing system, a reconfiguration of a server of the plurality of servers based on a respective test of the plurality of tests indicating a failure.

15. The method of claim 11, further comprising:

implementing, by the container orchestrator using the readiness custom resource and another specification, a post-deployment test suite to validate operations of the network controller and the network data plane of the SDN architecture system on the plurality of servers.

16. The method of claim 10, further comprising:

initiating, by the custom controller, a plurality of test jobs for performing the plurality of tests on the plurality of servers.

17. The method of claim 16, wherein the specification further specifies respective servers of the plurality of servers on which respective test jobs of the plurality of test jobs are deployed.

18. The method of claim 10, wherein the custom controller listens for events relating to the readiness test custom resources.

19. A non-transitory computer-readable medium comprising instructions that upon execution cause a computing system having one or more hardware processors to:

create a readiness custom resource in a container orchestrator executable on the one or more hardware processors and that deploys containers across a plurality of servers, the readiness custom resource being according to a readiness custom resource definition (CRD) and representing a test suite;

deploy a custom controller for the readiness custom resource, the custom controller executable on the one or more hardware processors to listen for events relating to the readiness custom resource including receiving a specification that specifies:

a plurality of tests of the test suite for a software-defined networking (SDN) architecture system, and a plurality of container images to execute respective tests of the plurality of tests and produce statuses of the respective tests, wherein the plurality of tests are to evaluate whether the plurality of servers is suitably configured for deployment of workloads in the SDN architecture system;

create, in the container orchestrator, readiness test custom resources for respective individual tests of the test suite, the readiness test custom resources being according to a readiness test CRD;

deploy, for each test of the plurality of tests represented by the readiness test custom resources, a corresponding container image of the plurality of container images to execute on a server of the plurality of servers;

set, based on the statuses from the plurality of container images, a status for the readiness custom resource; and based on the status for the readiness custom resource indicating success, deploy a workload to at least one of the plurality of servers.

20. The non-transitory computer-readable medium of claim 19, wherein the specification further specifies respective servers of the plurality of servers on which respective tests of the plurality of tests are deployed.

* * * * *